US012566240B2

(12) United States Patent
Wang et al.

(10) Patent No.: US 12,566,240 B2
(45) Date of Patent: Mar. 3, 2026

(54) INTEGRATED LITHIUM NIOBATE PHOTONIC MILLIMETER-WAVE RADAR

(71) Applicant: City University of Hong Kong, Hong Kong (CN)

(72) Inventors: Cheng Wang, Hong Kong (CN); Sha Zhu, Hong Kong (CN); Yue Bun Edwin Pun, Hong Kong (CN); Yiwen Zhang, Hong Kong (CN)

(73) Assignee: City University of Hong Kong, Hong Kong (CN)

( * ) Notice: Subject to any disclaimer, the term of this patent is extended or adjusted under 35 U.S.C. 154(b) by 302 days.

(21) Appl. No.: 18/414,802

(22) Filed: Jan. 17, 2024

(65) Prior Publication Data

US 2025/0138142 A1 May 1, 2025

Related U.S. Application Data

(60) Provisional application No. 63/592,962, filed on Oct. 25, 2023.

(51) Int. Cl.
G01S 7/03 (2006.01)
G01S 7/35 (2006.01)

(52) U.S. Cl.
CPC .............. G01S 7/032 (2013.01); G01S 7/352 (2013.01)

(58) Field of Classification Search
CPC . G01S 7/032; G01S 7/352; H03C 7/02; G04F 5/14; H03L 7/26

(Continued)

(56) References Cited

U.S. PATENT DOCUMENTS

| | | | | |
|---|---|---|---|---|
| 4,711,995 | A | * | 12/1987 | Genest ............... G07C 9/00722 235/382 |
| 5,051,754 | A | * | 9/1991 | Newberg ................ G01S 7/003 342/54 |

(Continued)

FOREIGN PATENT DOCUMENTS

| | | | | |
|---|---|---|---|---|
| CN | 111512182 | A | * | 8/2020 ........... G01S 7/4815 |
| EP | 1936401 | A1 | * | 6/2008 ............. G01S 7/006 |

(Continued)

OTHER PUBLICATIONS

Ghelfi, P. et al., A fully photonics-based coherent radar system; Macmillan Publishers Limited; Mar. 20, 2014, vol. 507, pp. 341-345.

(Continued)

*Primary Examiner* — Nuzhat Pervin
(74) *Attorney, Agent, or Firm* — S&F/WEHRW

(57) ABSTRACT

A centimeter-resolution integrated photonic millimeter-wave (mmWave) radar chip operating in the mmWave V band based on a 4-inch wafer-scale thin-film lithium niobate (TFLN) technology is provided. The fabricated TFLN photonic mmWave integrated circuit has a first electro-optic modulator (EOM) capable of generating a broadband linear frequency modulated mmWave radar waveform through optical frequency multiplication of a low-frequency input signal, and a second EOM for frequency de-chirp of the reflected echo wave, thereby greatly relieving bandwidth requirements for the digital-to-analog converter in the transmitter and analog-to-digital converter in the receiver. In the absence of optical and electrical filters, the radar chip features continuous on-demand tunability of the center frequency and bandwidth, currently only limited by the bandwidths of electrical amplifiers. The radar chip provides a promising way to achieve high resolution sensing and detec- (Continued)

tion for vehicle radar, airborne radar, and smart home in the 6G era.

20 Claims, 11 Drawing Sheets

(58) Field of Classification Search
USPC ........................................................ 342/200
See application file for complete search history.

(56) References Cited

U.S. PATENT DOCUMENTS

| | | | | |
|---|---|---|---|---|
| 5,539,411 | A * | 7/1996 | Yu | G01S 7/411 |
| | | | | 342/54 |
| 5,786,786 | A * | 7/1998 | Small | G01S 7/38 |
| | | | | 342/170 |
| 7,269,354 | B1 * | 9/2007 | Silverman | H04B 10/2575 |
| | | | | 398/115 |
| 8,334,797 | B1 * | 12/2012 | Ng | G02F 7/00 |
| | | | | 341/137 |
| 8,593,716 | B1 * | 11/2013 | Thiel | H04B 10/506 |
| | | | | 359/278 |
| 9,377,290 | B2 * | 6/2016 | Yun | A61B 5/0066 |
| 9,817,121 | B2 * | 11/2017 | Inoue | G01P 3/68 |
| 10,132,610 | B2 * | 11/2018 | Swanson | G01B 9/02069 |
| 10,234,706 | B2 * | 3/2019 | Guillet De Chatellus | |
| | | | | H01S 3/0057 |
| 10,605,921 | B2 * | 3/2020 | Zou | G01S 13/0209 |
| 10,649,308 | B2 * | 5/2020 | Zou | H01S 3/1068 |
| 10,735,127 | B1 * | 8/2020 | Chen | H04J 14/0223 |
| 11,243,307 | B2 * | 2/2022 | Pillet | G01S 7/4915 |
| 11,581,946 | B2 * | 2/2023 | El Amili | H01S 5/0623 |
| 11,675,069 | B2 * | 6/2023 | Maleki | G01S 13/865 |
| | | | | 342/54 |
| 11,838,056 | B2 * | 12/2023 | Mokhtari-Koushyar | |
| | | | | H04B 10/503 |
| 12,019,180 | B2 * | 6/2024 | Kulmer | G01S 7/4069 |
| 12,326,514 | B2 * | 6/2025 | Zou | G01S 7/032 |
| 12,339,366 | B2 * | 6/2025 | Chai | G01S 17/89 |
| 12,372,610 | B2 * | 7/2025 | Zheng | G01S 7/356 |
| 2004/0264977 | A1 * | 12/2004 | Yap | G02F 2/02 |
| | | | | 398/161 |
| 2006/0085160 | A1 * | 4/2006 | Ouchi | G01S 7/032 |
| | | | | 702/150 |
| 2007/0019282 | A1 * | 1/2007 | Weiner | G02F 2/002 |
| | | | | 359/326 |
| 2008/0227410 | A1 * | 9/2008 | Cox | H04B 10/505 |
| | | | | 455/82 |
| 2011/0064415 | A1 * | 3/2011 | Williams | G01S 13/58 |
| | | | | 398/115 |
| 2013/0016004 | A1 * | 1/2013 | Pierno | G01S 7/28 |
| | | | | 342/195 |
| 2014/0197983 | A1 * | 7/2014 | Reuter | G01S 13/343 |
| | | | | 342/175 |
| 2015/0207567 | A1 * | 7/2015 | Bogoni | H04B 10/2575 |
| | | | | 398/115 |
| 2016/0146931 | A1 * | 5/2016 | Rao | G01S 13/931 |
| | | | | 342/59 |
| 2017/0254898 | A1 * | 9/2017 | Park | G01S 13/584 |
| 2018/0106904 | A1 * | 4/2018 | Zou | G01S 13/26 |
| 2019/0235050 | A1 * | 8/2019 | Maligeorgos | G01S 13/325 |
| 2019/0316951 | A1 * | 10/2019 | McCormick | G01F 23/2845 |
| 2019/0391243 | A1 * | 12/2019 | Nicolaescu | G01S 17/42 |
| 2020/0200892 | A1 * | 6/2020 | Rajab | G01S 13/753 |
| 2020/0303815 | A1 * | 9/2020 | Baheti | G01S 13/32 |
| 2021/0100451 | A1 * | 4/2021 | Cao | A61B 5/1116 |
| 2021/0239792 | A1 * | 8/2021 | Rumpler | G01S 13/87 |
| 2022/0021454 | A1 * | 1/2022 | Maleki | H04B 10/00 |
| 2022/0057482 | A1 * | 2/2022 | Fritzin | G01S 13/343 |
| 2022/0113398 | A1 * | 4/2022 | Maleki | G01S 13/865 |
| 2022/0190920 | A1 * | 6/2022 | El Amili | H04B 10/25758 |
| 2022/0244374 | A1 * | 8/2022 | Soltanaghaei | G01S 13/75 |
| 2022/0299601 | A1 * | 9/2022 | Jungmaier | G01S 7/35 |
| 2022/0373735 | A1 * | 11/2022 | Safavi-Naeini | G02F 1/212 |

| | | | | |
|---|---|---|---|---|
| 2023/0236285 | A1 * | 7/2023 | Zhang | G01S 13/343 |
| | | | | 600/430 |
| 2023/0324504 | A1 * | 10/2023 | Zou | H04L 27/20 |
| 2024/0053464 | A1 * | 2/2024 | Dahnoun | G01S 13/886 |
| 2024/0168140 | A1 * | 5/2024 | Dupont | H03F 3/087 |
| 2024/0241256 | A1 * | 7/2024 | Crouch | G01S 17/89 |
| 2024/0272275 | A1 * | 8/2024 | Rao | G01S 13/343 |

FOREIGN PATENT DOCUMENTS

| | | | | | |
|---|---|---|---|---|---|
| EP | 3942329 | B1 * | 5/2024 | .......... | G01S 7/4917 |
| WO | WO-2022008063 | A1 * | 1/2022 | ............. | G01S 13/88 |
| WO | WO-2022015861 | A2 * | 1/2022 | ............. | H04B 10/00 |
| WO | WO-2024064857 | A1 * | 3/2024 | ........... | H04B 7/0452 |

OTHER PUBLICATIONS

Manolatou, C. et al., All-Optical Silicon Modulators Based on Carrier Injection by Two-Photon Absorption, Journal of Lightwave Technology, vol. 24, No. 3, Mar. 2006, pp. 1433-1439.

Zhou, P. et al., An RF-Source-Free Reconfigurable Microwave Photonic Radar With High-Resolution and Fast Detection Capability, Journal of Lightwave Technology, vol. 40, pp. 2862-2869.

Li, R. et al., Demonstration of a microwave photonic synthetic aperture radar based on photonic-assisted signal generation and stretch processing, Opt. Express, vol. 25, No. 13, Jun. 26, 2017, pp. 14334-14340.

He, M. et al., High-performance hybrid silicon and lithium niobate Mach-Zehnder modulators for 100 Gbits-1 and beyond, pp. 1-21.

Wang, C. et al., Integrated lithium niobate electro-optic modulators operating at CMOS-compatible voltages, Spring Nature Limited, vol. 562.

Marpaung, D. et al., Integrated microwave photonics, Laser Photonics Rev. 7, No. 4, pp. 506-538.

Marpaung, D. et al., Integrated microwave photonics; Nature Photonics; vol. 13, Feb. 2019, pp. 80-90.

Liu et al., Integrated Sensing and Communications: Toward Dual-Functional Wireless Networks for 6G and Beyond, IEEE Journal on Selected Areas in Communications, vol. 40, No. 6, Jun. 2022, pp. 1728-1767.

Boes et al., Lithium niobate photonics: Unlocking the electromagnetic spectrum, Science 379, 40, Jan. 6, 2023.

Ziqian Zhang et al., Photonic radar for contactless vital sign detection, Nature Photonics, vol. 17, Sep. 2023, pp. 791-797.

Suman Ravuri et al., Skilful precipitation nowcasting using deep generative models of radar, Nature, vol. 597, Sep. 30, 2021.

Marco Mercuri et al., Vital-sign monitoring and spatial tracking of multiple people using a contactless radar-based sensor, Nature Electronics, vol. 2, Jun. 2019, pp. 252-262.

Shuping Dang et al., What should 6G be?, Nature Electronics, vol. 3, Jan. 2020, pp. 20-29.

P. Ghelfi et al., "A fully photonics-based coherent radar system," Nature, vol. 507, pp. 341-345, Mar. 20, 2014.

R. Chen et al., "Breaking the temporal and frequency congestion of LiDAR by parallel chaos," Nature Photonics, vol. 17, Apr. 2023, pp. 306-314.

C. Wang et al., "Integrated lithium niobate electro-optic modulators operating at CMOS-compatible voltages," Nature, vol. 562, pp. 101-104, Oct. 4, 2018.

D. Marpaung, J. Yao and J. Capmany, "Integrated microwave photonics," Nature Photonics, vol. 80, issue 13, Feb. 2019, pp. 80-90.

Z. Zhang, Y. Liu, T. Stephens and B. J. Eggleton, "Photonic radar for contactless vital sign detection," Nature Photonics, vol. 17, Sep. 2023, pp. 791-797.

A. Herter et al., Terahertz waveform synthesis in integrated thin-film lithium niobate platform, Nature Communications, vol. 14, article No. 11 (2023).

V. Snigirev et al., "Ultrafast tunable lasers using lithium niobate integrated photonics," Nature, vol. 615, pp. 411-417 (2023).

S. Zhu et al., "Waveguide-Integrated Two-Demensional Material Photodetectors in Thin-Film Lithium Niobate," Advanced Photonics Research, 2003, vol. 4, issue 7.

(56) References Cited

OTHER PUBLICATIONS

H.K. Shankarananda, S. S. Shreyas, and B. Guruprassa, "External Modulators and Mathematical Modeling of Mach-Zehnder Modulator," IJISET—International Journal of Innovative Science, Engineering & Technology, vol. 3, iss. 12, Dec. 2016.

* cited by examiner

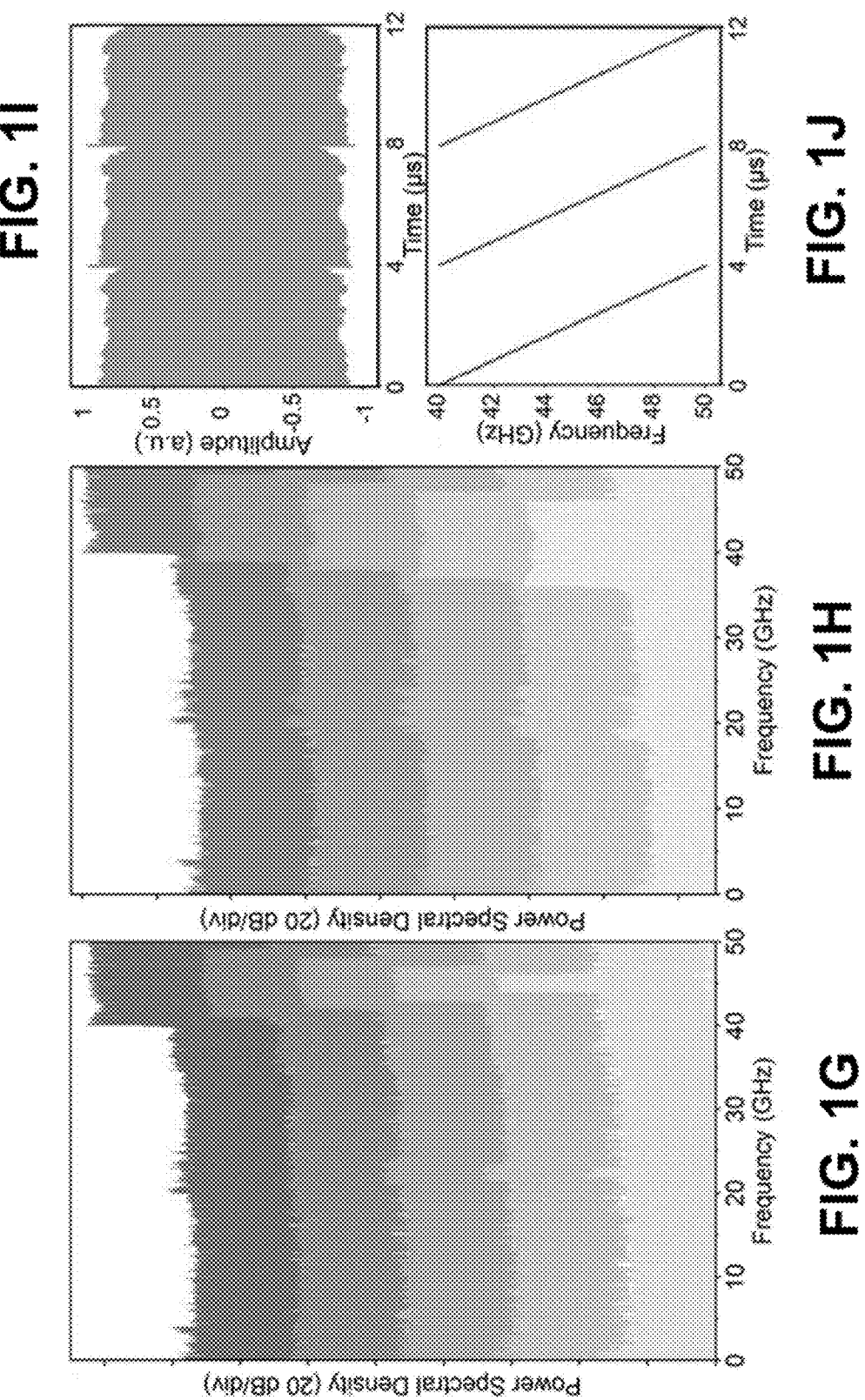

INTEGRATED LITHIUM NIOBATE PHOTONIC MILLIMETER-WAVE RADAR

CROSS-REFERENCE TO RELATED APPLICATIONS

This application claims priority to, and the benefit of, U.S. Provisional Patent Application Ser. No. 63/592,962 filed Oct. 25, 2023, the disclosure of which is incorporated by reference herein in its entirety.

ABBREVIATIONS 6G sixth-generation wireless
AC alternating current
ADC analog-to-digital converter
ANT antenna
AWG arbitrary waveform generator
CMOS complementary metal-oxide semiconductor
CPI coherent processing interval
CS-DSB carrier-suppressed double sideband
DAC digital-to-analog converter
DC direct current
DPMZM dual-parallel Mach-Zehnder modulator
EA electrical amplifier
EOM electro-optic modulator
FFT fast Fourier transform
FPC fiber-polarization controller
FPGA field programmable gate array
ICP-RIE inductively coupled plasma-reactive ion etching
IF intermediate frequency
ISAC integrated sensing and communication
ISAR inverse synthetic aperture radar
LD laser diode
LFMW linear frequency modulated waveform
LNA low-noise amplifier
LNOI lithium niobate on insulator
LNPIC lithium niobate photonic integrated circuit
MMI multimode interferometer
mmWave millimeter-wave
MZM Mach-Zehnder modulator
OSA optical spectrum analyzer
OSC oscilloscope
PHODIR photonic-assisted fully digital radar
PD photodetector
RF radio frequency
Si silicon
SWaPSC size, weight, power consumption, stability, and cost
TFLN thin film lithium niobate
TIA trans-impedance amplifier
UV ultraviolet
VNA vector network analyzer

TECHNICAL FIELD

The present disclosure generally relates to a photonic mmWave radar. In particular, the present disclosure relates to an integrated lithium niobate photonic mmWave radar realized by utilizing a LNPIC.

BACKGROUND

For decades, radio detection and ranging (radar) at microwave frequencies has been the fundamental technology for various applications, such as airborne object detection, weather forecast, resource exploration and vital-sign monitoring [1], [2]. In the forthcoming 6G era, mmWave radars operating at even higher frequencies above 30 GHz and with broader bandwidths are anticipated to play a pivotal role in ISAC systems that require high-resolution detection and real-time situational awareness, enabling new application scenarios like indoor sensing, automated driving, and vital-sign monitoring [3]-[5]. However, the operation frequency and bandwidth of traditional electrical radar systems are typically limited and often trade off with each other, making it challenging to precisely locate, recognize, and image objects with large detection ranges and fine resolution simultaneously.

The emergence of photonics-based radar technology provides a promising solution to overcome these limitations by processing microwave signals in the optical domain. It leverages the benefits of photonics systems, including high frequency, large bandwidth, low transmission loss, reconfigurability, and anti-electromagnetic interference [6]. [7]. In 2014, the first PHODIR was demonstrated based on a mode-locked laser and optical domain frequency conversion technology [8]. A phase-coded microwave radar waveform is generated for the detection of a non-cooperative aircraft with a ranging resolution of 23 m, which was significantly limited by the narrow signal bandwidth of 200 MHz. To further improve the resolution, different architectures of microwave photonic radars have been proposed, such as frequency multiplication [9], optical injection of semiconductor lasers [10], photonic stretch processing [11], cyclic frequency shift [12], and frequency up-conversion [13]-[15]. However, most microwave photonic radars to date are still constructed using discrete optoelectronic devices with significant disadvantages in terms of SWaPSC.

Recently, integrated photonics has opened up new opportunities for improving the SWaPSC performance of microwave photonic systems by miniaturizing and integrating multiple photonic devices in chip-scale systems [16]-[22]. Benefiting from compatibility with mature CMOS fabrication technology, several Si photonic chip-based radars have been realized in the microwave S (2-4 GHz), C (4-8 GHz), X (8-12 GHz), and Ku (12-18 GHz) bands [23]-[25], with a maximum demonstrated bandwidth of 6 GHz (from 12 to 18 GHz) [23]. However, the modulation mechanism employed by silicon EOMs, i.e. free carrier depletion, presents inherent limitations to achievable performances in Si photonic radars. These limitations include restricted bandwidths, nonlinear electro-optic responses, and limited extinction ratios, significantly impacting the operational frequency range of radars and the signal quality of radar waveforms. Additionally, active silicon photonic devices are prone to two-photon and free-carrier absorption, particularly at excessive optical power levels that are often needed in microwave photonic systems [26]. As a result, integrated photonic radars demonstrated to date have not been able to reach mmWave bands (>30 GHz), which are highly desired in future indoor sensing, automated driving, as well as 6G-based imaging and sensing networks.

In short, conventional photonic radars are mostly realized by tabletop systems composed of bulky discrete components, whereas the more compact integrated photonic radars are difficult to reach the mmWave bands due to the unsatisfactory bandwidths and signal integrity of underlining EOMs. There is a need in the art for developing an integrated photonic radar to reach mmWave bands.

A TFLN platform is an excellent candidate to address these challenges and bring the operation frequency of integrated photonic radars into mmWave bands. On one hand, TFLN exhibits a fast and linear Pockels effect, making it well suited for achieving high-speed linear EOMs. On the other hand, the high index contrast of TFLN allows for tight confinement of optical modes, thereby enabling the implementation of multiple photonic functionalities in a single TFLN photonic integrated circuit [27]-[35]. In recent years, a number of TFLN-based EOMs have been developed, achieving unprecedented performance metrics including modulation bandwidths deep into the mmWave bands [28], [36]-[38], CMOS-compatible drive voltages [27], [39], [40], small footprint [41], and ultra-high modulation linearity [42]. Moreover, the TFLN platform is compatible with cost-effective wafer-scale fabrication techniques [43], [44], and is equipped with a full range of functional device toolbox including low-loss waveguides [44], high-quality-factor microresonators [45], waveguide crossings [46], delay lines [47], etc. These collective achievements have paved the path for the TFLN platform to be applied in a variety of future integrated microwave and photonic mmWave applications that require high frequency, large bandwidth, and compact form factor at the same time [48].

SUMMARY

Provided herein is a photonic mmWave radar system.

The system comprises a light source, a signal generator, a frequency multiplying module, a splitting means, a TIA, a LNA and a frequency de-chirp module.

The light source is used for generating an optical carrier.

The signal generator is used for generating a first electrical signal having a LFMW.

The frequency multiplying module is used for frequency-multiplying the first electrical signal. The frequency multiplying module comprises an amplitude-modulating means and a first PD. The amplitude-modulating means is a means for amplitude-modulating the optical carrier with the first electrical signal to yield a first optical signal. The first PD is used for converting a first attenuated copy of the first optical signal into a second electrical signal such that the second electrical signal is generated according to a square of an envelope of the first attenuated copy to thereby cause an instantaneous frequency of the second electrical signal to be doubled of an instantaneous frequency of the first electrical signal. In the system, amplification of the second electrical signal forms a radar signal for remote sensing so that the frequency multiplying module reduces a bandwidth requirement of the signal generator in generating the radar signal.

The amplitude-modulating means is selected from the following items and their equivalents: a first EOM configured to be biased at a null transmission point of the first EOM; a cascade of a third EOM and a first micro ring filter, an output of the third EOM being connected to an input of the first micro ring filter, the third EOM being configured to be biased at a full transmission point of the third EOM; and a cascade of a DPMZM and a second micro ring filter, an output of the DPMZM being connected to an input of the second micro ring filter, wherein the DPMZM comprises a first MZM and a second MZM, the first and second MZMs being connected in parallel, the first MZM being arranged to receive the first electrical signal, the second MZM being arranged to receive a 90°-phase-shifted version of the first electrical signal, and wherein the first MZM, the second MZM and a main-DC bias of the DPMZM are biased at respective maximum transmission points. Preferably, the signal generator is used to further generate the 90°-phase-shifted version of the first electrical signal for reception by the second MZM. Optionally, each of the first, third EOMs and DPMZM is a capacitively loaded traveling-wave electrode EOM.

The splitting means is a means for splitting the first optical signal into a second optical signal and a third optical signal such that the second optical signal is the first attenuated copy of the first optical signal as forwarded to the first PD. The splitting means may be a MMI, a directional coupler or an adiabatic coupler. In certain embodiments, the MMI is a 50:50 MMI.

The TIA is used for amplifying the second electrical signal to generate the radar signal, where the radar signal is a chirp signal used for remote sensing.

The LNA is used for amplifying a reflected echo signal to yield a third electrical signal, where the reflected echo signal is a signal formed with one or more echoes respectively reflected from one or more objects irradiated by the radar signal in the remote sensing.

The frequency de-chirp module is used for de-chirping the reflected echo signal and resolving the one or more echoes. The frequency de-chirp module comprises a second EOM and a second PD. The second EOM is used for amplitude-modulating the third optical signal with the third electrical signal to yield a fourth optical signal, where the second EOM is configured to be biased at a quadrature transmission point. The second PD is used for converting the fourth optical signal to a fourth electrical signal such that the fourth electrical signal is generated according to a square of an envelope of the fourth optical signal. Both biasing the second EOM at the quadrature transmission point and generating the fourth electrical signal according to the square of the envelope of the fourth optical signal de-chirps the reflected echo signal and enables a delay of an individual echo in the reflected echo signal to be determinable from a peak in a frequency spectrum of the fourth electrical signal.

In the system, additionally, the amplitude-modulating means, second EOM and splitting means are TFLN photonic circuits integrated on a LNPIC.

In certain embodiments, the radar signal is in a frequency range from 1 to 300 GHz.

In certain embodiments, the signal generator is a DAC arranged to be inputted with a digital signal of the LFMW.

In certain embodiments, the system further comprises an ADC for digitizing the fourth electrical signal received from the second PD.

In certain embodiments, the system further comprises a DSP configured to receive the digitized fourth electrical signal and determine the delay of the individual echo from the received digitized fourth electrical signal.

In certain embodiments, the system further comprises a transmitting antenna and a receiving antenna. The transmitting antenna is used for emitting the radar signal to outside the system for remotely sensing the one or more objects. The receiving antenna is used for receiving the reflected echo signal.

In one embodiment, each of the transmitting and receiving antennas is a horn antenna. In another embodiment, each of the transmitting and receiving antennas is a microstrip antenna, a patch antenna, a slot antenna or a Goubau-line antenna.

In certain embodiments, at least the light source, the signal generator, the LNPIC, the TIA, the LNA, the first PD, the second PD and the ADC are integrated on an integrated photonic mmWave radar chip.

In certain embodiments, at least the light source, the signal generator, the LNPIC, the TIA, the LNA, the first PD, the second PD, the ADC and the DSP are integrated on an integrated photonic mmWave radar chip.

In certain embodiments, at least the light source, the DAC, the LNPIC, the TIA, the LNA, the first PD, the second PD, the ADC, the DSP, the transmitting antenna and the receiving antenna are integrated on an integrated photonic mmWave radar chip.

Other aspects of the present disclosure are disclosed as illustrated by the embodiments hereinafter.

BRIEF DESCRIPTION OF THE DRAWINGS

FIGS. 1A-1J collectively show the conceptual illustration and working principle of an exemplary photonic mmWave radar system as disclosed herein, wherein:

FIG. 1A depicts a schematic diagram of the exemplary photonic mmWave radar system;

FIG. 1B shows a picture of a fabricated 4-inch TFLN wafer for a proof-of-concept demonstration of the disclosed system;

FIG. 1C shows a picture of a photonic mmWave radar chip cleaved from the TFLN wafer in comparison with a Hong Kong ten-dollar coin;

FIG. 1D plots measurement results for determining half-wave voltages of fabricated TFLN EOMs;

FIG. 1E plots measurement results for determining 3 dB electro-optic bandwidths over 50 GHz for the fabricated TFLN EOMs;

FIG. 1F shows measured optical spectra at the output of a first EOM used as an amplitude-modulating means (see FIG. 1A), showing a sideband to carrier suppression ratio of greater than 25 dB;

FIG. 1G shows a first spectrum of a generated radar signal showing arbitrarily configurable bandwidths (2-10 GHz, centered at 45 GHz);

FIG. 1H shows a second spectrum of the generated radar signal showing arbitrarily configurable center frequencies (41-45 GHz, with a fixed bandwidth of 10 GHz);

FIG. 1I plots a measured time-domain waveform of a radar signal; and

FIG. 1J plots a frequency-time diagram of the radar signal.

FIGS. 2A-2C are concerned with a high-resolution photonic mmWave ranging radar, wherein:

FIG. 2A depicts an experimental setup for the radar ranging measurements, where an inset in FIG. 2A shows a microscope image of the photonic mmWave radar chip under test;

FIG. 2B plots measured distances versus actual distances for single targets placed at various locations, where insets i) shows measured optical spectrum at the output of a second EOM (see FIG. 1A), insets ii-viii) show measured de-chirped electrical spectra for different target distances (horizontal axes have been converted into distance values for better visualization), inset ix) shows measured ranging errors for different target distances, and the diagonal line in the plot corresponds to the ideal relationship; and FIG. 2C plots measured distances versus actual distances for two and three targets placed at various locations, where inset iv) shows measured de-chirped electrical spectra for the various testing scenarios, inset vi) shows top-down picture of the testing setup illustrating the relative positions of the antennas and targets, inset vii) shows measured ranging errors for the various testing scenarios, and the diagonal line in the plot corresponds to the ideal relationship.

FIGS. 4A-4F are concerned with a high-resolution photonic mmWave imaging radar, wherein:

FIG. 4A depicts a schematic illustration of the imaging radar test scene;

FIG. 4B provides radar imaging results for various numbers and arrangements of small metal corner reflectors with a size of 3 cm×3 cm;

FIG. 4C plots radar imaging results for a large airplane model imaged at various azimuthal rotation angles;

FIG. 4D plots radar imaging results for a medium airplane model imaged at various azimuthal rotation angles;

FIG. 4E plots radar imaging results for a small airplane model imaged at various azimuthal rotation angles; and FIG. 4F plots radar imaging results for a doll imaged at various azimuthal rotation angles.

FIGS. 5A-5C depict three realizations of an amplitude-modulating means used in the photonic mmWave radar system, wherein:

FIG. 5A depicts a first EOM biased at a null transmission point;

FIG. 5B depicts a third EOM cascaded with a first micro ring filter, where the third EOM is biased at a full transmission point; and FIG. 5C depicts a cascade of a DPMZM and a second micro ring filter, where the DPMZM comprises first and second MZMs, and the first and second MZMs and a main-DC bias of the DPMZM are biased at respective maximum transmission points.

FIG. 6 depicts a schematic diagram of a capacitively loaded traveling-wave electrode EOM, which may be used to realize the first, second and third EOMs.

Skilled artisans will appreciate that elements in the figures are illustrated for simplicity and clarity and have not necessarily been depicted to scale.

DETAILED DESCRIPTION

The disclosure will be more fully described below with reference to the accompanying drawings. However, the present disclosure may be embodied in a number of different forms and should not be construed as being limited to the embodiments described herein.

The present disclosure provides a photonic mmWave radar system for remote sensing. The system uses a mmWave signal (in the frequency range of 30-300 GHz) to perform remote sensing. The photonic mmWave radar system is implemented based on TFLN photonic circuits, and the TFLN photonic circuits are integrated on a LNPIC for various advantages mentioned above. By further integrating the LNPIC with other circuit components fabricated with other semiconductor materials, an integrated photonic mmWave radar system realized as a TFLN photonic radar chip is formed. For demonstration and for illustration of the disclosed system, an exemplary photonic mmWave radar system operated in the mmWave V band (which is a band of frequencies ranging from 40 to 75 GHz) is detailed hereinafter. The exemplary system is preferably and advantageously realized as a TFLN photonic radar chip. Nonetheless, the present disclosure is not limited only to operating the disclosed system in the mmWave V band. The disclosed system can be implemented to operate in any segment of the mmWave band (30-300 GHz).

For proof-of-concept demonstration and experimental verification, the exemplary system is realized as a TFLN photonic radar chip. Fabricated from a 4-inch wafer-scale process, the TFLN photonic radar chip has a frequency multiplying module for mmWave radar waveform generation and a frequency de-chirp module for echo signal reception. Benefitting from the broad bandwidths of all photonic components in the disclosed chip with the no-filter design of the system, advantageously, the center frequency and bandwidth of the generated radar waveforms can be arbitrarily configured over a wide range. Hence, the disclosed integrated photonic mmWave radar features continuous on-demand tunability of the center frequency and bandwidth, currently only limited by the bandwidths of electrical amplifiers. In the case as presently discussed, the radar waveforms are located within 40-50 GHz, limited only by electrical amplifiers used in the radar chip. The high carrier frequency and large bandwidth enable one to achieve multi-target ranging with a distance resolution of 1.50 cm, velocity measurement with a resolution of 0.067 m/s, and ISAR imaging with a two-dimensional resolution of 1.50 cm×1.06 cm.

The disclosed system is illustrated with the aid of FIGS. 1A-1J, which collectively show the conceptual illustration and working principle of an exemplary photonic mmWave radar system 100. Radar waveform generation is also shown.

A. Development of the Disclosed System

Figure 1A:
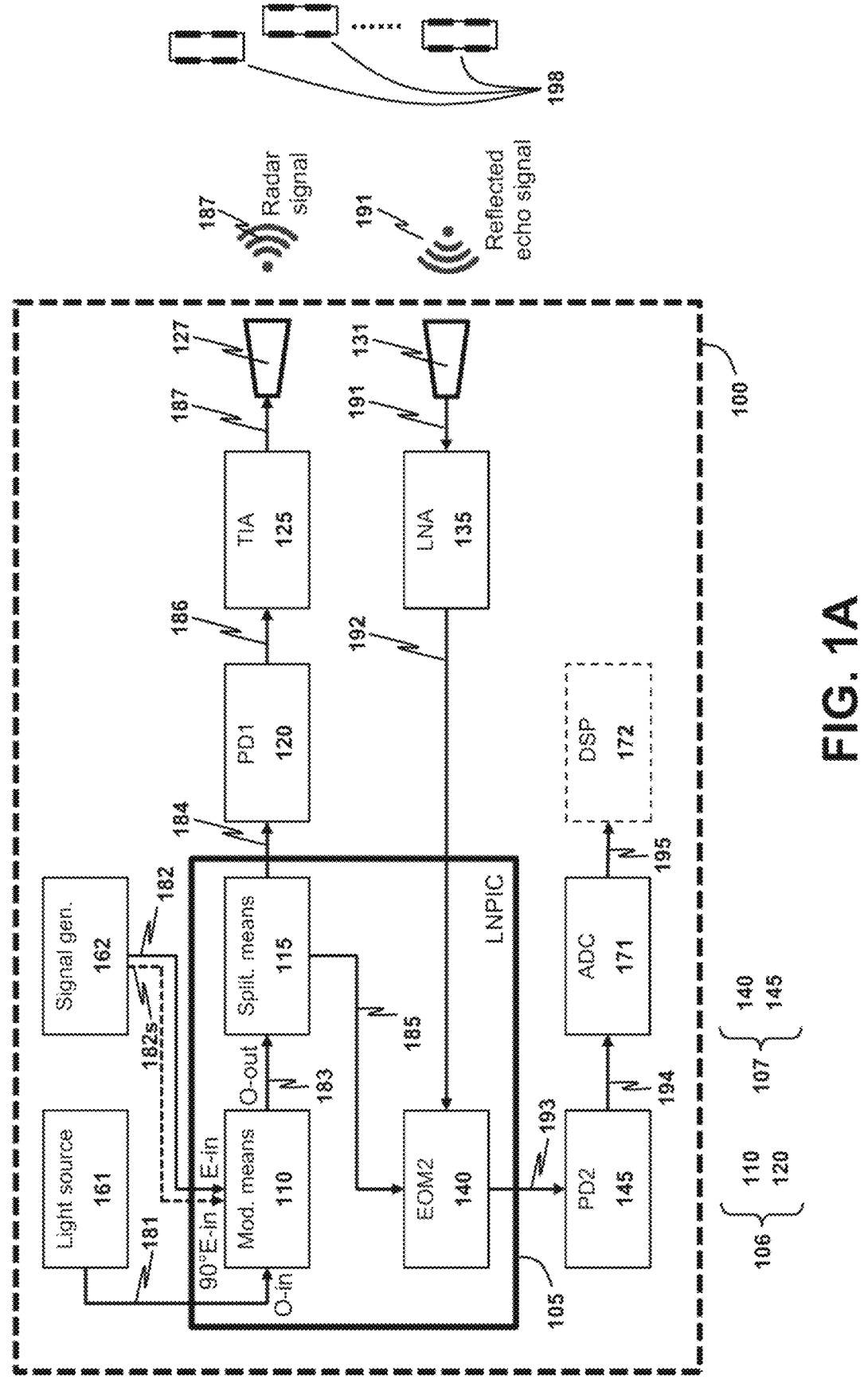

FIG. 1A depicts a schematic diagram of the exemplary photonic mmWave radar system 100. It is preferable and advantageous to implement the system 100 on an integrated photonic mmWave radar chip, as highlighted by a dashed line bounding the system 100 in FIG. 1A.

In the system 100, a LFMW, which is a chirp signal, is selected as a radar waveform in the present disclosure since the LFMW features a high ranging resolution, a constant modulus, and Doppler tolerance, as well as a straightforward frequency de-chirp process for echo waveforms so as to greatly alleviate sampling rate requirements of a radar receiver. To generate a mmWave LFMW signal at the transmitter side, up-conversion of a low-frequency microwave LFMW signal, which is an electrical signal, into an optical frequency is performed. Specifically, an optical carrier with a frequency of $f_c$ is modulated by the microwave LFMW signal via using a first high-speed TFLN amplitude modulator, which is implemented as an EOM fabricated on a LNPIC for illustration purposes. This fundamental microwave LFMW signal can be relatively easily produced by, e.g., a CMOS DAC. The DAC features an instantaneous frequency of $f_1+kt$ that linearly changes from $f_1$ to $f_1+kT$ with a bandwidth of $B_1=kT$, where T is the waveform period. Biasing the EOM at a null transmission point leads to a CS-DSB modulation process that projects the input microwave signal into two LFMW optical sidebands with frequencies of $f_c+f_1+kt$ and $f_c-f_1-kt$, respectively. Afterwards, the modulated optical signal is divided into two paths by a splitting means. The splitting means is realizable as a MMI, a directional coupler or an adiabatic coupler. If the splitting means is the MMI, usually the MMI is a 50:50 MMI. The optical signal in the upper path is detected by a first high-speed PD to generate a mmWave radar waveform whose initial frequency $(2f_1)$ and bandwidth $(B_2=2kT)$ are both doubled from the DAC-input electrical signal. The generated radar waveform is then amplified by a TIA and emitted into free space by a transmitting antenna. When the emitted radar waveform encounters a target, the waveform is reflected with a time delay of $\tau$. The reflected echo waveform is collected by a receiving antenna, amplified by a LNA, and sent to the frequency de-chirp module comprising a second high-speed TFLN amplitude modulator, which is implemented as an EOM fabricated on the same LNPIC. The input port of the EOM is connected to the lower output path of the splitting means, thus featuring two carrier frequencies of $f_c+f_1+kt$ and $f_c-f_1-kt$, which are subsequently modulated by the amplified reflected echo signal with an instantaneous frequency of $2f_1+2kt-2k\tau$. By setting the EOM at a quadrature transmission point, four new optical sidebands are generated, out of which two sidebands are located in the vicinity of the two carriers, at frequencies of $f_c+f_1+kt-2k\tau$ and $f_c-f_1-kt+2k\tau$. The presence of the two last-mentioned frequencies allows one to achieve frequency de-chirp and obtain the low frequency target information $(2k\tau)$ by beating these two relevant sidebands with the two nearby carriers at a low-speed PD and further processing the output of the low-speed PD by using a low-speed ADC.

Based on the above-mentioned explanation on operational principles of the system 100, embodiments of the disclosed photonic mmWave radar system are elaborated as follows.

The photonic mmWave radar system 100 is used for remote sensing of one or more objects 198, such as nearby vehicles. Specifically, the photonic mmWave radar system 100 is configured to generate a radar signal 187 for remote sensing of the one or more objects 198, and to analyze a reflected echo signal 191 reflected from the one or more objects 198 irradiated by the radar signal 187 in the remote sensing. Exemplarily, the photonic mmWave radar system 100 comprises a light source 161, a signal generator 162, a frequency multiplying module 106, a splitting means 115, a TIA 125, a LNA 135 and a frequency de-chirp module 107. The frequency multiplying module 106 comprises an amplitude-modulating means 110 and a first PD 120. The frequency de-chirp module comprises a second EOM 140 and a second PD 145. Utilizing advantages offered by using lithium niobate, the amplitude-modulating means 110, the second EOM 140 and the splitting means 115 are TFLN photonic circuits integrated on a LNPIC 105.

The light source 161 is used for generating an optical carrier 181. Usually, the light source 161 is a laser source such that the optical carrier 181 is a monochromatic light beam. In certain embodiments, the laser source is realized by a LD.

The signal generator 162 is used for generating a first electrical signal 182 having a LFMW. The first electrical signal 182 is the microwave LFMW signal as mentioned above. In certain embodiments, the signal generator 162 is a DAC arranged to be inputted with a digital signal of the LFMW.

The frequency multiplying module 106 is used for frequency-multiplying (e.g., frequency doubling, quadrupling, etc.) the first electrical signal 182. The frequency up-converted signal is usable to generate the radar signal 187. Advantageously, frequency up-conversion of the first electrical signal 182 in the process of generating the radar signal 187 reduces a bandwidth requirement of the signal generator 162. This advantage is especially significant as the radar signal 187 is intended to be operated in the mmWave frequency range (30-300 GHz). Even a halving of the bandwidth requirement is often a substantial reduction in the requirement. Furthermore, this advantage is particularly useful when the signal generator 162 is realized by a DAC, where the aforementioned bandwidth requirement is a sampling rate requirement of the DAC.

Figures 5A, 5B, 5C, 6:
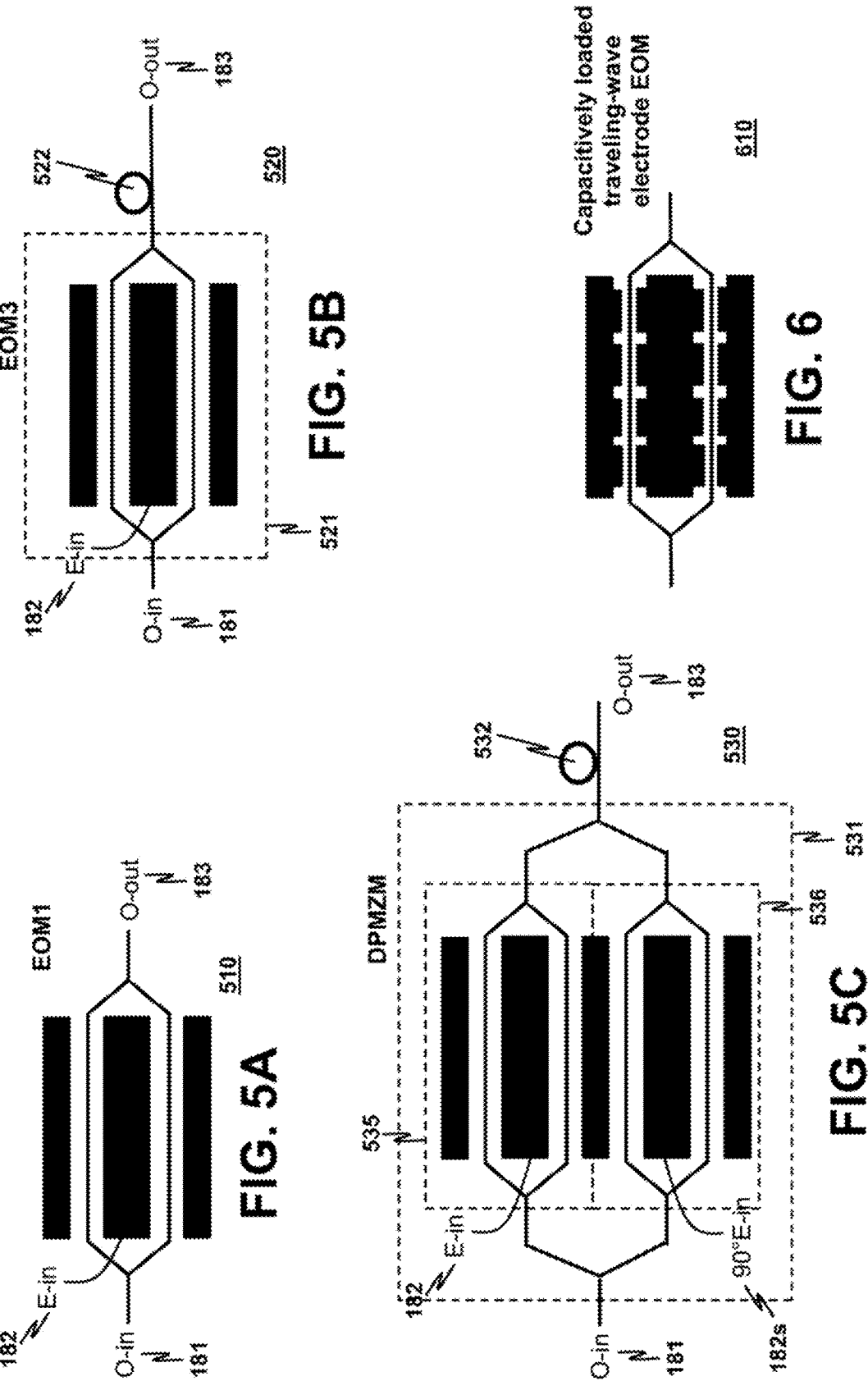

The frequency multiplying module 106 comprises the amplitude-modulating means 110 and the first PD 120. The amplitude-modulating means 110 is the first high-speed TFLN amplitude modulator as mentioned above. The amplitude-modulating means 110 may be realized as an EOM (referred to as a first EOM). FIG. 5A depicts the first EOM 510 as a realization of the amplitude-modulating means 110. In illustrating the operation of the frequency multiplying module 106 as follows, it is assumed that the amplitude-modulating means 110 is implemented by the first EOM 510. Other realizations of the amplitude-modulating means 110 will be discussed later.

The first EOM 510 is used for amplitude-modulating the optical carrier 181 with the first electrical signal 182 to yield a first optical signal 183. The first optical signal 183, $E_1(t)$, is expressed as $$E_1(t) = \frac{1}{2} E_0 e^{j2\pi f_c t} \cdot \left\{ \exp\left[ j\frac{\pi V_1}{V_\pi} \cos\left(2\pi\left(f_1 + \frac{1}{2}kt\right)t\right)\right] + \right.$$
$$\left. \exp\left[ -j\frac{\pi V_1}{V_\pi} \cos\left(2\pi\left(f_1 + \frac{1}{2}kt\right)t\right) + j\frac{\pi V_{DC1}}{V_\pi}\right]\right\}, \quad (1)$$

where: $E_0$ and $f_c$ are the amplitude and frequency of the optical carrier 181, respectively; $V_1$, $f_1+kt$, $k$, $T$ and $B_1$ ($B_1=kT$) are the amplitude, instantaneous frequency, chirp rate, waveform period and bandwidth of the first electrical signal 182, respectively; $V_{DC1}$ is a DC bias voltage applied to the first EOM 510, and $V_\pi$ is the half-wave voltage of the first EOM 510. Particularly, the first EOM 510 is configured to be biased at a null transmission point such that the first optical signal 183 is a CS-DSB signal. (For background information on EOMs and various settings on the transmission point, see [50].) As a result, the first optical signal 183 can be written as $$E_1(t) = E_0 J_1(\beta_1) \cdot$$
$$\left\{ \exp\left[ j\left(2\pi\left(f_c + f_1 + \frac{1}{2}kt\right) \cdot t + \frac{\pi}{2}\right)\right] + \exp\left[ j\left(2\pi\left(f_c - f_1 - \frac{1}{2}kt\right) \cdot t + \frac{\pi}{2}\right)\right]\right\}, \quad (2)$$

where: $J_n$ is the n-order first-kind Bessel function; and $\beta_1=\pi V_1/V_\pi$ is the corresponding RF modulation index of the first EOM 510.

The first PD 120 is used for converting a first attenuated copy 184 of the first optical signal 183 into a second electrical signal 186. Denote the first attenuated copy 184 of the first optical signal 183 as a second optical signal 184. The second optical signal 184 is a copy of the first optical signal 183 scaled down in signal power. Since a PD is a transducer that senses an intensity of an input optical signal to yield an output electrical signal, the second electrical signal 186 is generated according to a square of an envelope of the second optical signal 184. The nonlinear operation of the first PD 120 causes an instantaneous frequency of the second electrical signal 184 to be doubled of an instantaneous frequency of the first electrical signal 182. The second electrical signal 184, $I_1(t)$, which is expressed as a current outputted by the first PD 120, is given by $$I_1(t) = 2E_0^2 J_1^2(\beta_1) \cdot \cos(2\pi(2f_1 + kt) \cdot t). \quad (3)$$

The initial frequency ($f_2=2f_1$) and bandwidth ($B_2=2kT=2B_1$) of the generate radar waveform are doubled of those of the first electrical signal 182. Those skilled in the art will appreciate that the second electrical signal 184 given by EQN. (3) has the DC offset removed (by, for instance, AC coupling at the output of the first PD 120) and is suitable to be used to form the radar signal 187.

The splitting means 115 is a means for splitting the first optical signal 183 received from the first EOM 510 into the second optical signal 184 and a third optical signal 185 such that the second optical signal 184 is the first attenuated copy 184 of the first optical signal 183. The second optical signal 184 as generated by the splitting means 115 is forwarded to the first PD 120. The third optical signal 185 is used as a reference signal for estimating an echo delay of an echo in remote sensing. The splitting means 115 is a MMI, a directional coupler, an adiabatic coupler, or any equivalent thereof. In certain embodiments, the splitting means 115 is selected to be a MMI, and the MMI is a 50:50 MMI such that the second and third optical signals 184, 185 have same optical intensity levels.

The second electrical signal 186, which is provided in the form of current, is amplified by the TIA 125 to generate the radar signal 187.

The radar signal 187 is a chirp signal used for remote sensing of the one or more objects 198. As a result, the system 100 receives the reflected echo signal 191 for echo delay estimation. The reflected echo signal 191 is a signal formed with one or more echoes respectively reflected from the one or more objects 198 irradiated by the radar signal 187 in the remote sensing.

The LNA 135 is used for amplifying the reflected echo signal 191 to yield a third electrical signal 192. Advantageously, interfering outliers, such as out-of-band signals, may also be filtered off by the LNA 135 to enhance detectability of the one or more echoes.

The frequency de-chirp module 107 is used for de-chirping the reflected echo signal 191 and resolving the one or more echoes. The frequency de-chirp module comprises the second EOM 140 and the second PD 145. The second EOM 140 is the second high-speed TFLN amplitude modulator as mentioned above.

The second EOM 140 is used for amplitude-modulating the third optical signal 185, which is received from the splitting means 115, with the third electrical signal 192 to yield a fourth optical signal 193. The second EOM 140 is configured to be biased at a quadrature transmission point. The second PD 145 is used for converting the fourth optical signal 193 to a fourth electrical signal 194. Similar to the generation of the second electrical signal 186 by the first PD 120, the fourth electrical signal 194 is generated according to a square of an envelope of the fourth optical signal 194. Furthermore, both biasing the second EOM 140 at the quadrature transmission point and generating the fourth electrical signal 194 according to the square of the envelope of the fourth optical signal 194 de-chirps the reflected echo signal 191 and enables a delay of an individual echo in the reflected echo signal 191 to be determinable from a peak in a frequency spectrum of the fourth electrical signal 194.

The determination of the echo delay by the frequency de-chirp module 107 is further explained as follows by a mathematical derivation for a special case that the reflected echo signal 191 contains one echo. Extension of the mathematical derivation to the case of multiple echoes is straightforward.

For the special case under consideration, let $\tau$ be a time delay of the single echo contained in the reflected echo signal 191. The reflected echo signal 191 is received and is amplified by the LNA 135 to form the third electrical signal 192. By applying the third electrical signal 192 to the second EOM 140 and biasing the second EOM 140 at the quadrature transmission point, the fourth optical signal 193 obtained at the output of the second EOM 140 is expressed as $$E_2(t) = \sqrt{2}\,E_0 J_1(\beta_1) J_0(\beta_2) \cdot \left(e^{j\rho_1} + e^{j\rho_2}\right) + \tag{4}$$
$$\sqrt{2}\,E_0 J_1(\beta_1) J_1(\beta_2) \cdot \left(e^{j\rho_3} + e^{j\rho_4} + e^{j\rho_5} + e^{j\rho_6}\right)$$

in which $$\rho_1 = 2\pi\left(f_c + f_1 + \frac{1}{2}kt\right)\cdot t + \frac{3\pi}{4},$$

$$\rho_2 = 2\pi\left(f_c - f_1 - \frac{1}{2}kt\right)\cdot t + \frac{3\pi}{4},$$

$$\rho_3 = 2\pi\left(f_c + 3f_1 + \frac{3}{2}kt - 2k\tau\right)\cdot t + \frac{3\pi}{4} - 2\pi(2f_1 - k\tau)\cdot\tau,$$

$$\rho_4 = 2\pi\left(f_c - f_1 - \frac{1}{2}kt + 2k\tau\right)\cdot t + \frac{3\pi}{4} + 2\pi(2f_1 - k\tau)\cdot\tau,$$

$$\rho_5 = 2\pi\left(f_c + f_1 + \frac{1}{2}kt - 2k\tau\right)\cdot t + \frac{3\pi}{4} - 2\pi(2f_1 - k\tau)\cdot\tau,$$

and $$\rho_6 = 2\pi\left(f_c - 3f_1 - \frac{3}{2}kt + 2k\tau\right)\cdot t + \frac{3\pi}{4} + 2\pi(2f_1 - k\tau)\cdot\tau,$$

where $\beta_2 = \pi V_2/V_\pi$ and $V_2$ are the corresponding RF modulation index of the second EOM 140 and the amplitude of the third electrical signal 192 (namely, of the reflected echo signal 191 after amplification), respectively. Afterwards, the second PD 145 generates the fourth electrical signal 194 according to the square of the envelope of the fourth optical signal 193. Making use of the nonlinear operation equivalent to obtaining the square of signal envelope, the second PD 145 recovers the fourth electrical signal 194 by beating two optical sidebands at frequencies of $f_c+f_1+kt$ and $f_c+f_1+kt-2k\tau$ (or $f_c-f_1-kt+2k\tau$ and $f_c-f_1-kt$). It follows that the fourth electrical signal 194, denoted as $I_{de}(t)$, satisfies the following relationship:

$$I_{de}(t) \propto 4J_0(\beta_2) J_1(\beta_2) \cdot \cos(2\pi(2k\tau)t + 2\pi(2f_1 - k\tau)\tau). \tag{5}$$

The frequency ($f_{de}$) of the de-chirp electrical signal (namely, the fourth electrical signal 194) is $2k\tau$. Hence, the frequency $f_{de}$ is proportional to the time delay of the echo.

Apart from the first EOM 510, other realizations of the amplitude-modulating means 110 are elaborated as follows.

FIG. 5B depicts a second realization of the amplitude-modulating means 110. In this realization, the amplitude-modulating means 110 is a cascade 520 of a third EOM 521 and a first micro ring filter 522. The third EOM 521 has an output connected to an input of the first micro ring filter 522. Different from the first EOM 510, the third EOM 521 is configured to be biased at a full transmission point of the third EOM 521.

The operational principle and advantages of the cascade 520 are explained as follows. By biasing the third EOM 521 at the full transmission point (in order to suppress first-order optical sidebands in signal modulation) and incorporating the first micro ring resonator 522 to filter out the optical carrier 181, a carrier-suppressed second-order sideband optical signal can be obtained as the first optical signal 183. After photodetection by the first PD 120, frequency quadrupling can be achieved through beating the two second-order sidebands. Afterwards, the generated frequency quadrupling LFMW is used to generate the radar signal 187, which is emitted to the free space for remote sensing.

FIG. 5C depicts a third realization of the amplitude-modulating means 110. In this realization, the amplitude-modulating means 110 is a cascade 530 of a DPMZM 531 and a second micro ring filter 532. An output of the DPMZM 531 is connected to an input of the second micro ring filter 532. The DPMZM 531 comprises a first MZM 535 and a second MZM 536. The first and second MZMs 535, 536 are connected in parallel. The first MZM 535 is arranged to receive the first electrical signal 182. The second MZM 536 is arranged to receive a 90°-phase-shifted version 182s of the first electrical signal 182. In particular, the first MZM 535, the second MZM 536 and a main-DC bias of the DPMZM 531 are biased at respective maximum transmission points. Preferably, the signal generator 162 is used to further generate the 90°-phase-shifted version 182s of the first electrical signal 182 such that the second MZM 536 receives the 90°-phase-shifted version 182s from the signal generator 162.

The operational principle and advantages of the cascade 530 are provided as follows. Replacing the first EOM 510 with the DPMZM 531 provides a factor of eight in frequency multiplying a signal's frequency and bandwidth. It can greatly increase the frequency and bandwidth of the resultant radar signal 187. In detail, the first electrical signal 182 is processed with a 90° electrical hybrid 537. The original first electrical signal 182 is sent to the RF input of the first MZM 535 while the 90° phase-shifted version of the first electrical signal 182 is sent to the corresponding RF input of the second MZM 536. By biasing the two MZMs 535, 536 and the main-DC bias of the DPMZM 531 all at maximum transmission points, a fourth-order sideband signal added on the optical carrier 182 is obtained. A cascaded micro ring resonator acting as the second micro ring filter 532 is used to suppress the optical carrier 182. Therefore, a frequency-octupled LFMW is generated as the second electrical signal 186 after photodetection, and can subsequently be used to generate the radar signal 187.

Note that the amplitude-modulating means 110 is realizable by the circuits/devices/arrangements shown in FIGS. 5A-5C and equivalents of these circuits/devices/arrangements.

Furthermore, it is noted that the circuits/devices/arrangements shown in FIGS. 5A-5C provide amplitude modulation through summing different optical signals such that the first optical signal 183 is amplitude-modulated by means of constructive or destructive interference. The signal-summing process not only modulates the amplitude but also may modulate the phase of the optical carrier 181. It is understood that the amplitude-modulating means 110 as used herein provides amplitude modulation to the optical carrier 181 as a main function and may modulate the phase of the optical carrier 181 in forming the first optical signal 183. Nonetheless, the unwanted phase modulation does not affect the intended operation of the system 100. The first optical signal 183 is processed in part by the first PD 120 and in part by the second EOM 140 (for amplitude modulation) followed by the second PD 145. The unwanted modulation in the phase of the optical carrier 181 is removed in the photodetection process.

In realizing the amplitude-modulating means 110, the first EOM 510 or the third EOM 521 may be involved. In certain practical scenarios, it is required to achieve a resolution in millimeter scale in remote sensing. In certain embodiments, each of the first and third EOMs 510, 512 is a capacitively loaded traveling-wave electrode EOM [49]. It means that if the first EOM 510 (the third EOM 512) is involved in implementing the amplitude-modulating means 110, the first EOM 510 (the third EOM 512) is realized as a capacitively loaded traveling-wave electrode EOM 610, a schematic diagram of which is depicted in FIG. 6. By using the capacitively loaded traveling-wave electrode EOM 610 with a larger bandwidth, the system 100 can be used in a higher mmWave band with a broader bandwidth, thus realizing a millimeter resolution in remote sensing and imaging.

Note that if the first EOM 510 (the third EOM 512) is implemented as the capacitively loaded traveling-wave electrode EOM 610, it is preferable that the second EOM 140 is also implemented as the capacitively loaded traveling-wave electrode EOM 610 since the reflected echo signal 191 has the same bandwidth of the radar signal 187.

Other implementation details of the system 100 are elaborated as follows.

To determine echo delays of the one or more echoes, preferably the system 100 further comprises an ADC 171 for digitizing the fourth electrical signal 194 received from the second PD 145. The digitized fourth electrical signal 195 may be captured by a computer or a computing processor for determining the echo delays.

Since the de-chirping of the reflected echo signal 191 is handled by the frequency de-chirp module 107 in the optical domain, the ADC 171 is not required to handle a chirp signal, which has a significantly broader bandwidth in comparison to the fourth electrical signal 194. Advantageously, it reduces a bandwidth requirement or a conversion rate requirement of the ADC 171.

In certain embodiments, the system 100 further comprises a DSP 172 for echo delay estimation. The DSP 172 is configured to receive the digitized fourth electrical signal 195 and determine the echo delays of the one or more echoes from the received digitized fourth electrical signal 195.

The system 100 may further comprise a transmitting antenna 127 and a receiving antenna 131. The transmitting antenna 127 is used for emitting the radar signal 187 to outside the system 100 for remotely sensing the one or more objects 198. The receiving antenna 131 is used for receiving the reflected echo signal 191. The transmitting and receiving antennas 127, 131 may be implemented as horn antennas for high directivity. The transmitting and receiving antennas 127, 131 may also be implemented as microstrip antennas, patch antennas, slot antennas or Goubau-line antennas for integration of the system 100 on a radar chip co-packaged with the LNPIC 105, or even directly on the LNPIC 105. Other appropriate types of antennas may also be used.

The design of the transmitting antenna 127 and receiving antenna 131 is influenced by the choice of frequency of the radar signal 187. The radar signal 187 may be designed to have a signal frequency in a frequency range from 40 to 75 GHz, i.e. the V band. However, the present disclosure is not limited to this frequency range in generating the radar signal 187. In general, the signal frequency of the radar signal 187 may be selected from the microwave and mmWave frequency range of 1 GHz and 300 GHz.

As mentioned above, it is preferable and advantageous to implement the system 100 on an integrated photonic mmWave radar chip. In one embodiment, at least the light source 161, the signal generator 162, the LNPIC 105, the TIA 125, the LNA 135, the first PD 120, the second PD 145 and the ADC 171 are integrated on the radar chip. In another embodiment, the radar chip is further integrated with the DSP 172. In a further embodiment, the radar chip is further integrated with not only the DSP 172 but also the transmitting and receiving antennas 127, 131.

Note that PDs may be integrated directly on the LNPIC 105 using heterogeneous integration technology like microtransfer printing or die-to-wafer bonding. In certain embodiments, the first and second PD 120, 145 are implemented on the LNPIC 105.

B. Applications of the Disclosed System

For illustration, consider again the special case that only a single echo is present in the reflected echo signal 191. After the echo delay $\tau$ is determined by the system 100, the ranging, velocity, and imaging information of a target under detection can be obtained through subsequent data processing. It is envisioned that an application scenario of the integrated photonic mmWave radar system as disclosed is in future autonomous vehicles, offering high-resolution distance/velocity detection and imaging capabilities simultaneously, which are key to enhanced safety, perception, and decision-making processes in autonomous driving.

As mentioned above, $f_{de}$ of the de-chirp electrical signal is $2k\tau$, which is proportional to the echo delay. Thus, the range ($R_1$) between the transmitting antenna 127 (or the receiving antenna 131) and the detected target can be equal to $c\tau/2$, which is written as $$R_1 = \frac{cTf_{de}}{4B_1},\qquad(6)$$

where c is the speed of light. Therefore, the ranging detection can be achieved. If $f_{de}$ is equal to the minimum distinguishable frequency difference ($f_{min}=1/T$), the detected range is called theoretical ranging resolution ($\Delta R$), which can be expressed as $$\Delta R = \frac{c}{4B_1} = \frac{c}{2B_2}.\qquad(7)$$

Additionally, the radar realized by the system 100 possesses velocity detection capabilities. When a target moves towards or away from the radar line of sight by a distance of $\Delta r$, the received signal experiences an additional delay ($\Delta r$) which is introduced by Doppler shift compared to the echo signal received when the object is stationary. This additional phase change in the de-chirped electrical signal (i.e. the fourth electrical signal 194) can be expressed as $$\Delta\varphi = 2\pi f_{rc}\Delta\tau = \frac{4\pi\Delta r}{\lambda} = \frac{4\pi vT}{\lambda},\qquad(8)$$

where $f_{rec}$ is the center frequency of the radar signal 187, $\lambda$ is the wavelength of the radar signal 187, and T is the period of the chirped transmission signal. The phase exhibits a linear response to small distance changes in the target. The phase difference measured across two consecutive chirps can be used to estimate the velocity of the target. Hence, the estimated velocity, obtained from the measured phase difference, is expressed as $$v = \frac{\lambda \Delta \varphi}{4\pi T}. \tag{9}$$

Based on the properties of the Fourier transform, the peak phase of the Fourier spectrum represents the initial phase of the signal. However, when measuring the velocity with multiple objects using M-period chirps transmitted within a "frame" ($T_f=1/MT$), the values at the peak that contain phasor components from different targets can be distinguished by performing an FFT on the sequence corresponding to the range-FFT peaks, commonly known as a Doppler-FFT. If $\Delta \varphi$ equals the minimum distinguishable phase difference ($\Delta \varphi_{min}=2\pi/M$), the detected velocity is referred to as the theoretical velocity resolution ($\Delta v$), which can be calculated as $$\Delta v = \frac{\lambda}{2MT} = \frac{\lambda}{2T_f} = \frac{c}{2T_f f_{rc}}. \tag{10}$$

Next, an ISAR system has been demonstrated using the integrated photonic mmWave radar chip. A turntable model is used to analyze and simplify the movement of targets for ISAR imaging. The imaging process involves a relative rotation between the radar and the target, which can be observed in the joint range-Doppler domains. The target that is detected undergoes rotation at an angular velocity of $\omega_r$. To process the de-chirped electrical signal, we employ a low-speed OSC that performs multi-period sampling for a duration of $T_i$, equivalent to one CPJ. The collected data is then rearranged into a two-dimensional matrix (M×N) of delay times (M) and pulses number (N). By utilizing the relationship between delay time and distance, distance compression can be achieved through a FFT, which provides frequency domain information. Thus, the distance can be calculated based on the distance formula (EQN. (6)). The position of the amplitude peak in the distance envelope represents the distance location of the main scattering points. The translational component of the target with respect to the radar is useless for ISAR imaging, so motion compensation (including distance alignment and phase compensation) on the range compressed data to eliminate phase terms is necessarily required. At each distance unit, we conduct a Fourier transform on the reflected signals of N pulses, generating an N-point Doppler frequency domain and achieving azimuth compression. As a result, by applying Fourier transforms to both the distance and azimuth dimensions, one can obtain the image of the measured target. The resolution in the distance dimension remains the same as that in ranging detection, while the resolution in the azimuth dimension ($\Delta A$) is expressed as $$\Delta A = \frac{c f_a}{2 f_{rc} \omega_t} = \frac{c}{2 f_{rc} T_i \omega_t} = \frac{c}{2 f_{rc} \Delta \theta}, \tag{11}$$

where $f_a$ is equal to the minimum distinguishable frequency difference ($f_{min}=1/T_i$), $f_{rc}$ is the center frequency of the radar waveform, and $\Delta \theta$ is the accumulated angle during radar detection. The azimuth resolution is determined by the total number of pulses (N) within the CPI.

C. Proof-of-Concept Demonstration of the Disclosed System

Figures 1B, 1C, 1D, 1E, 1F:
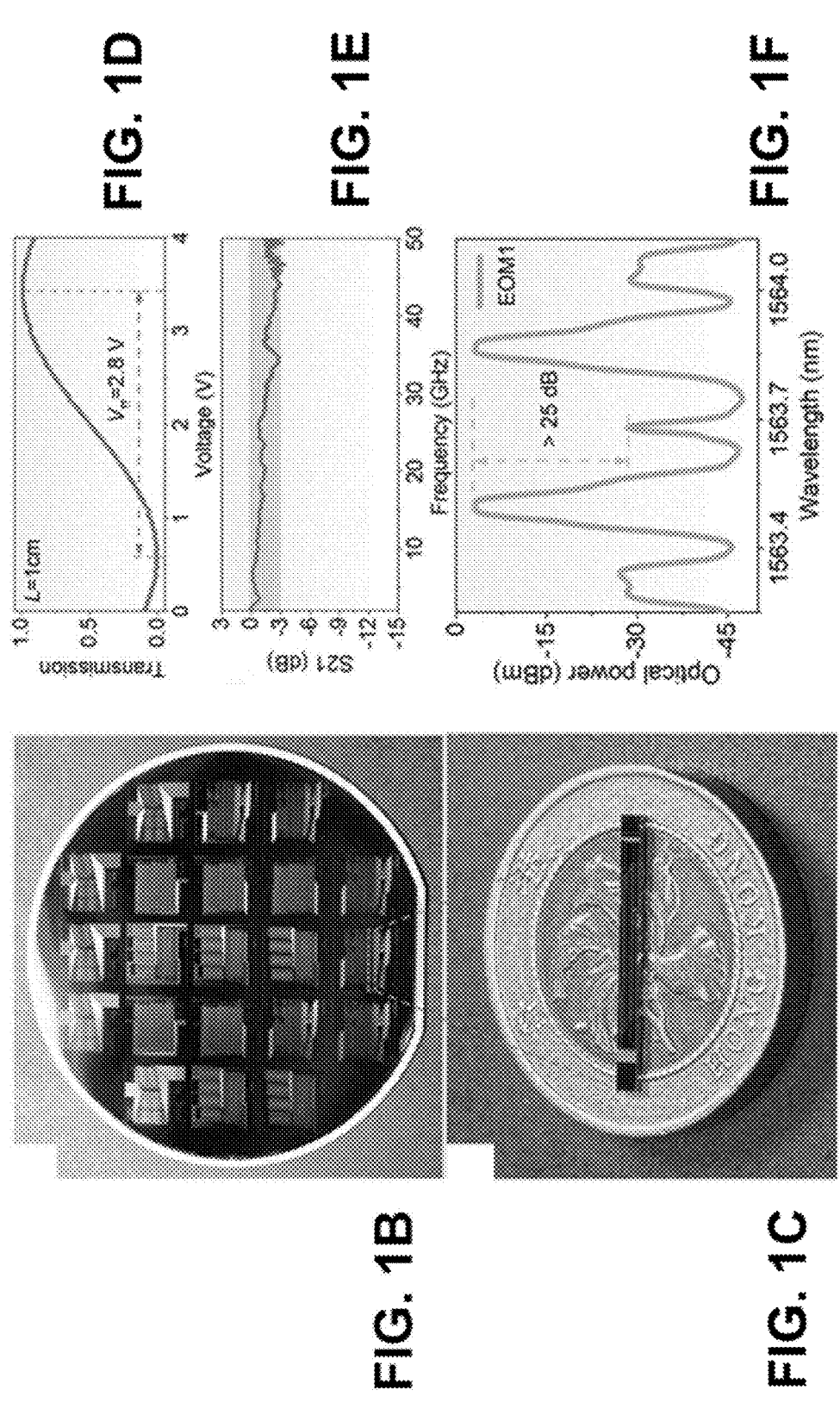

FIG. 1B shows a picture of our fabricated 4-inch LNOI wafer containing 1.50 cm×1.50 cm dices of various passive and active components, totaling 21 pieces. The wafer was patterned by an UV stepper lithography system and etched by an ICP-RIE system, followed by standard metallization processes. FIG. 1C shows an example TFLN photonic radar chip cleaved from a 4-inch LNOI wafer, featuring much smaller footprint than a Hong Kong ten-dollar coin. The fabricated TFLN EOMs exhibit measured half-wave voltages of ~2.8V and 3 dB electro-optic bandwidths over 50 GHz, as shown in FIGS. 1D and 1E, both of which are important metrics for achieving broadband and high-fidelity mmWave radar signal generation and echo processing.

We first show that our photonic mmWave radar chip is capable of generating high-quality LFMW signals with arbitrarily configurable center frequency and bandwidth in the mmWave V band. FIG. 1F displays the measured CS-DSB optical spectrum at the output port of the first EOM 510 when biased at null, showing a sideband-to-carrier suppression ratio higher than 25 dB thanks to the excellent extinction ratio of TFLN EOMs. It ensures a low residual fundamental component in the radar signal 187. After beating the CS-DSB optical signals at the first PD 120, LFMW signals that are frequency doubled from the driving electrical signal are generated, as shown in the measured electrical spectra in FIGS. 1G and 1H. Since no optical or electrical filters are involved in our photonic mmWave radar, the bandwidth and center frequency of the generated radar signal 187 could be arbitrarily chosen and continuously tuned over a broad range. FIG. 1G illustrates generated radar signals with a fixed center frequency of 45 GHz and increasing bandwidths from 2 GHz to 10 GHz with a step of 2 GHz, whereas FIG. 1H depicts corresponding signals with different center frequencies (41 GHz to 45 GHz, with a step of 1 GHz) and a fixed bandwidth of 10 GHz. In the rest of the present disclosure, we choose a full 41-50 GHz range as the LFMW radar waveform to achieve the best detection resolution, which is inversely proportional to the bandwidth and center frequency of the radar waveform. FIG. 1I displays the time-domain waveform of the radar signal 187 directly recorded using a real-time oscilloscope. The corresponding frequency-time diagram extracted from the time-domain radar waveform using short-time Fourier transform is shown in FIG. 1J. The frequency of the radar waveform linearly increases from 41 GHz to 50 GHz within a time period of 4 s, corresponding to a linear frequency chirp of 2.5 GHz/μs, which matches well with the measured electrical spectrum.

D. Examples of Radars Realized with the Disclosed Radar Chip

D.1. Photonic mmWave Ranging Radar

Figure 2A:
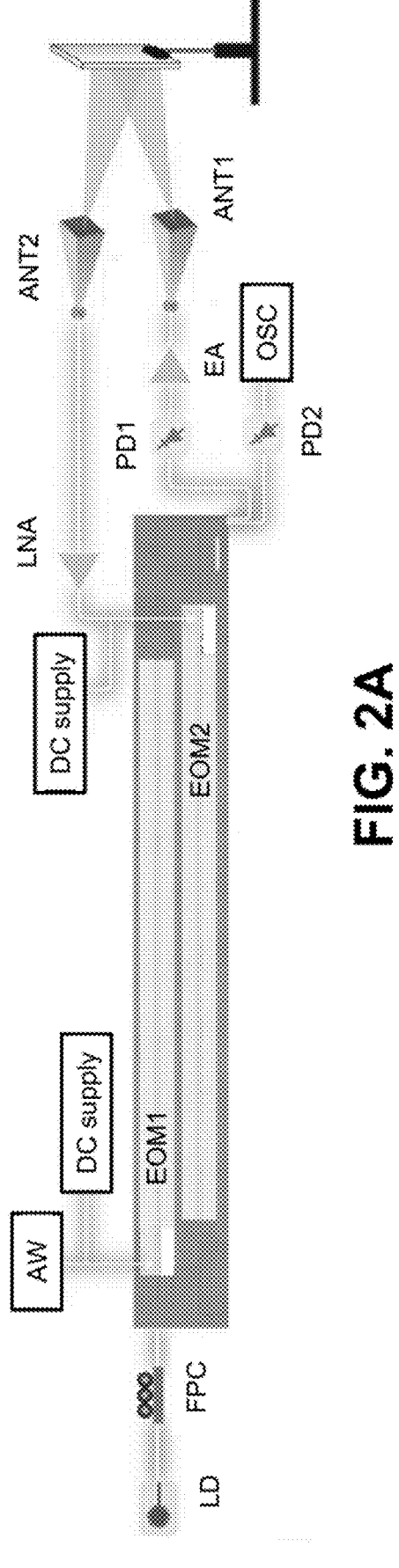
Figures 2B, 2C:
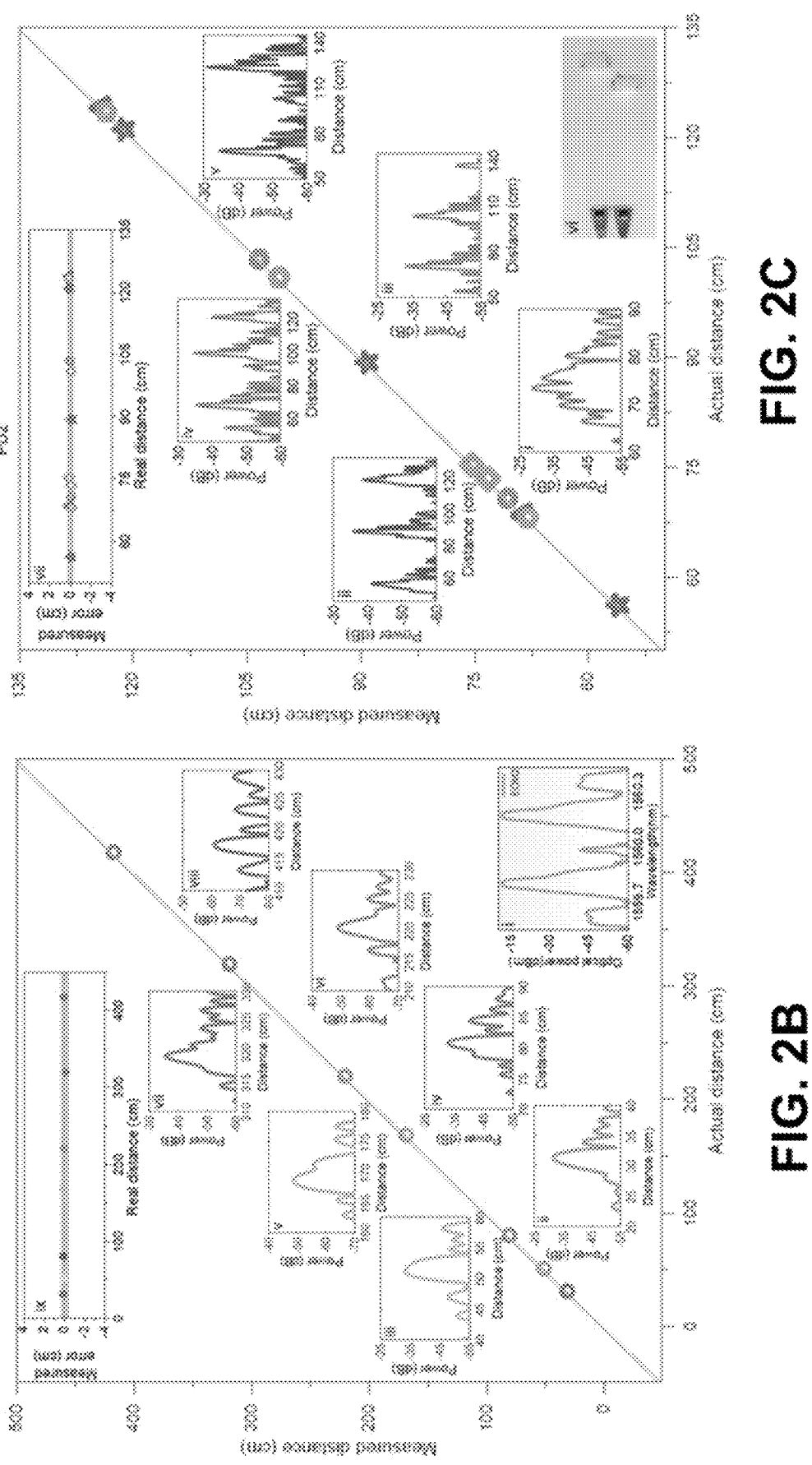

We demonstrate high-resolution ranging using our photonic mmWave radar chip. FIGS. 2A-2C collectively depict a high-resolution photonic mmWave ranging radar, and experimental results obtained for the radar.

FIG. 2A shows the experimental setup, the middle inset of which shows an optical microscope image of the fabricated chip. FIGS. 2B and 2C illustrate the measured ranging results for single and multiple (up to three) targets placed at various distances from the antennas, respectively. Inset i of FIG. 2B shows a representative measured optical spectrum at the output of the second EOM 140, where the two spectral peaks separated by ~45 GHz each include an optical carrier ($f_c-f_1-kt$ and $f_c+f_1+kt$, respectively) and a sideband generated by echo-wave modulation ($f_c-f_1-kt+2k\tau$ and $f_c+f_1+kt-2k\tau$, respectively). The closely located carriers and sidebands cannot be distinguished in the optical spectrum due to the limited resolution of the OSA, but could be easily de-chirped into low-frequency and narrow-bandwidth signals at MHz level and detected using a low-frequency PD for the second PD 145. It greatly reduces the sampling rate requirement of the ADC in the oscilloscope, which records the final time-domain waveform of the frequency de-chirped IF signals. After a FFT process, one obtains electrical spectra of the de-chirped IF signals, which directly translate into the target range ($R_1$) (insets ii-viii in FIG. 2B and insets i-v in FIG. 2C). The average range ambiguity (3 dB bandwidth) of the ranging measurement is 1.71 cm (285 kHz), which matches well with the theorical range (frequency) resolution of 1.50 cm (250 kHz). Besides, the unwanted side lobe suppression ratios of the range spectra are all above 6.5 dB, indicating low microwave signal crosstalk in our chip and good detection capability for small and weak targets. In the main panels of FIGS. 2B and 2C, we summarize and compare the measured range values and the real target distances for single-target (FIG. 2B) and multiple-target (FIG. 2C) measurements, showing accurate and linear ranging performances. The measured distance errors in single-target cases (inset ix of FIG. 2b) are all within ±0.15 cm for a large dynamic range of 30-420 cm. This ranging error could be further reduced by decreasing the chirp rate of the radar waveform. Our photonic mmWave radar also provides excellent ranging performances when detecting multiple targets (inset vi of FIG. 2C). Both two and three targets can be clearly distinguished, and the measurement distance errors are all within ±0.15 cm (inset vii of FIG. 2C). Importantly, we show that the photonic mmWave radar is capable of distinguishing two targets that are only 1.90 cm apart (yellow squares and inset i in FIG. 2C), which agrees well with the theoretical resolution of 1.50 cm.

D.2. Photonic mmWave Velocity-Detection Radar

Figure 3:
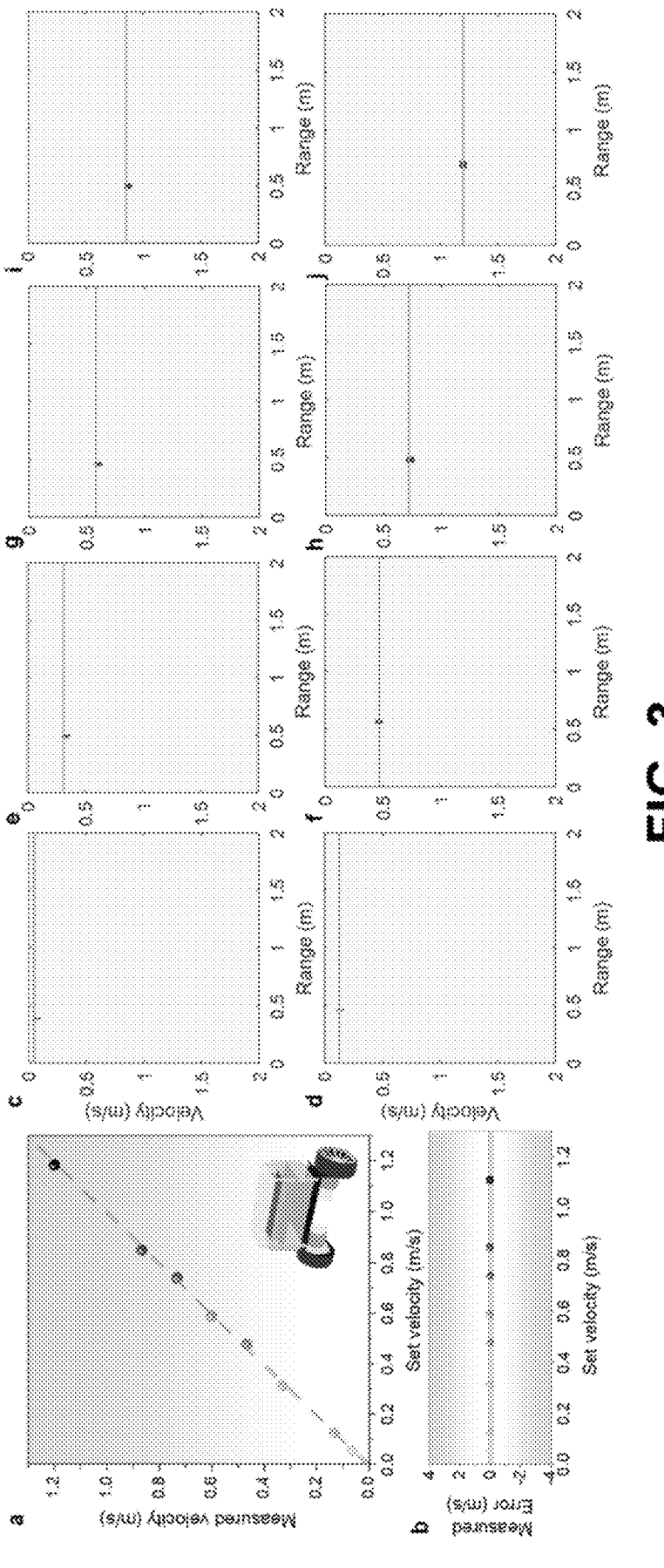
FIG. 3 plots, in subplots (a)-(j), experimental results obtained for a high-resolution photonic mmWave velocity-detection radar, where: subplot (a) plots measured target velocities at different set velocities, showing marginal deviation from the ideal relationship (dashed line); subplot (b) plots measured velocity errors at different set velocities; and subplots (c)-(j) plot measured two-dimensional velocity-range diagrams at various distances and velocities, solid lines on subplots (c)-(j) showing the set velocity values.

Besides distance detection, our photonic mmWave radar is also capable of high-resolution velocity detection, which relies on measuring the Doppler shift in the echo signal introduced by the motion of the targets. To demonstrate this capability, FIG. 3 plots experimental results obtained for high-resolution velocity detection. A small balanced car with tunable velocity is employed as the detection target, as depicted in subplot (a) of FIG. 3. The dots in subplot (a) of FIG. 3 represent the measured velocities versus different set velocity values, whereas subplot (b) of FIG. 3 shows the corresponding velocity measurement errors (all within ±0.017 m/s), revealing high velocity-detection fidelity over a wide velocity range of 0-1.2 m/s. Most notably, our photonic mmWave radar chip could successfully detect small velocities (corresponding to small Doppler shifts) down to 0.056 m/s. Further applying a two-dimensional Fourier transform to the de-chirped electrical waveforms enables simultaneous extraction of the velocity and range information of the targets, as demonstrated in subplots (c)-(j) of FIG. 3, where the vertical (velocity) span of the signals agrees well with the theoretical velocity resolution of 0.067 m/s. Such multi-dimensional environmental sensing capability could find applications in various domains, including automotive systems, traffic management, and object tracking.

D.3. Photonic mmWave ISAR for Imaging

Finally, we show that the photonic mmWave radar could support high-resolution imaging tasks. FIGS. 4A-4F collectively demonstrate this use of the radar.

Figure 4A:
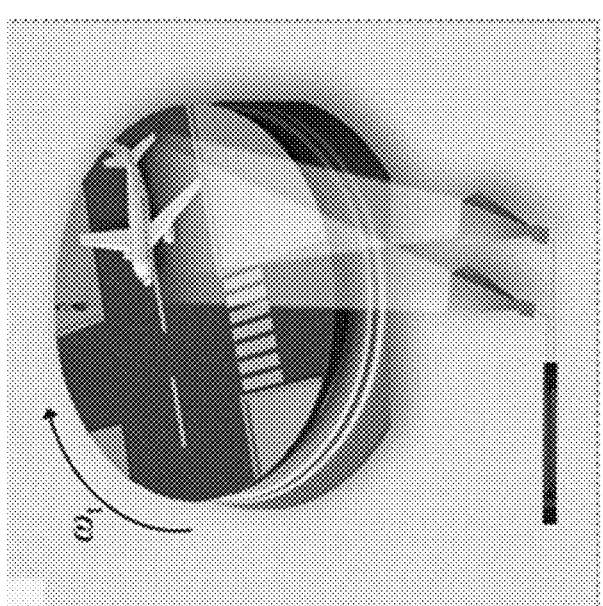
Figure 4B:
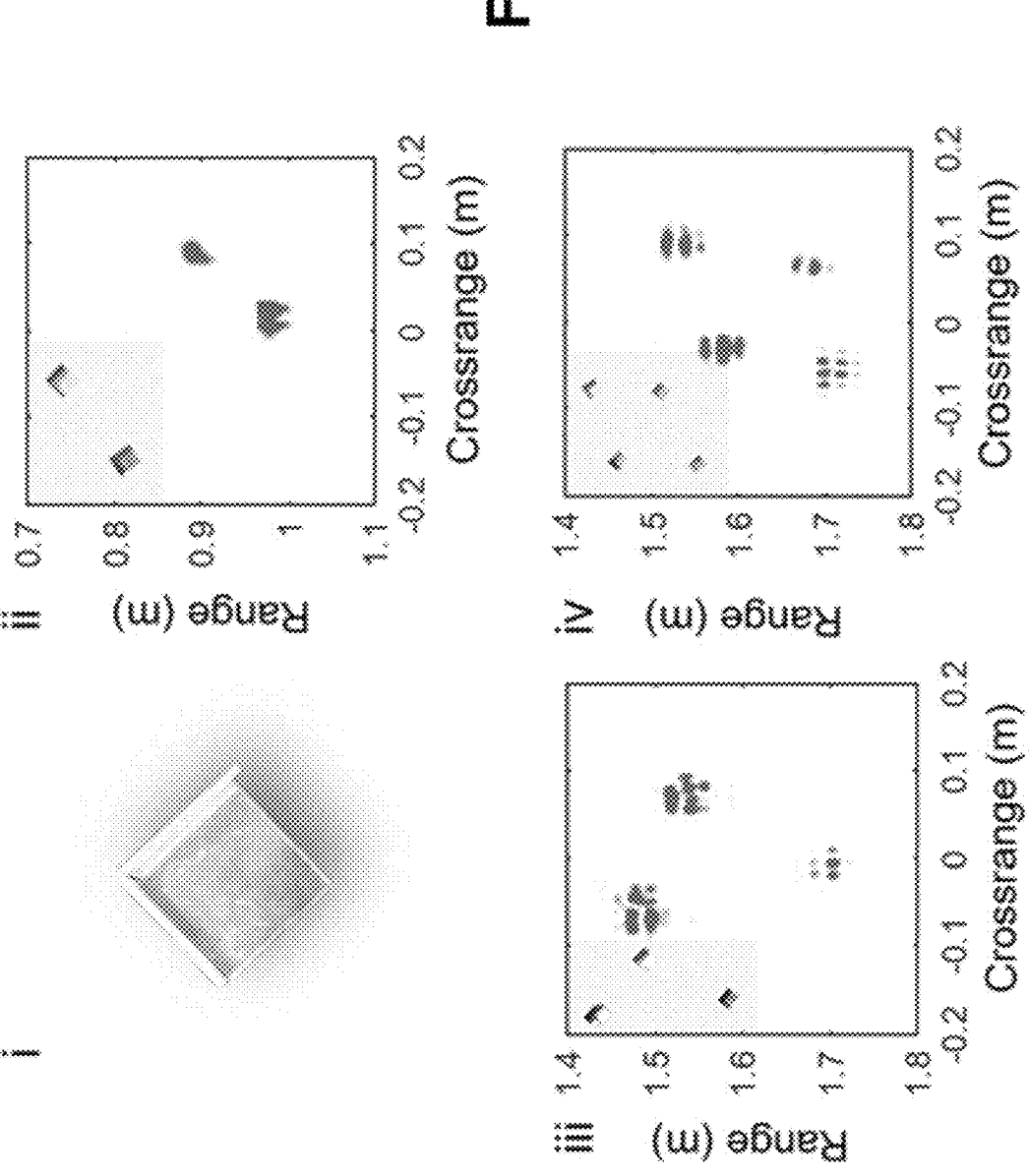
Figure 4C:
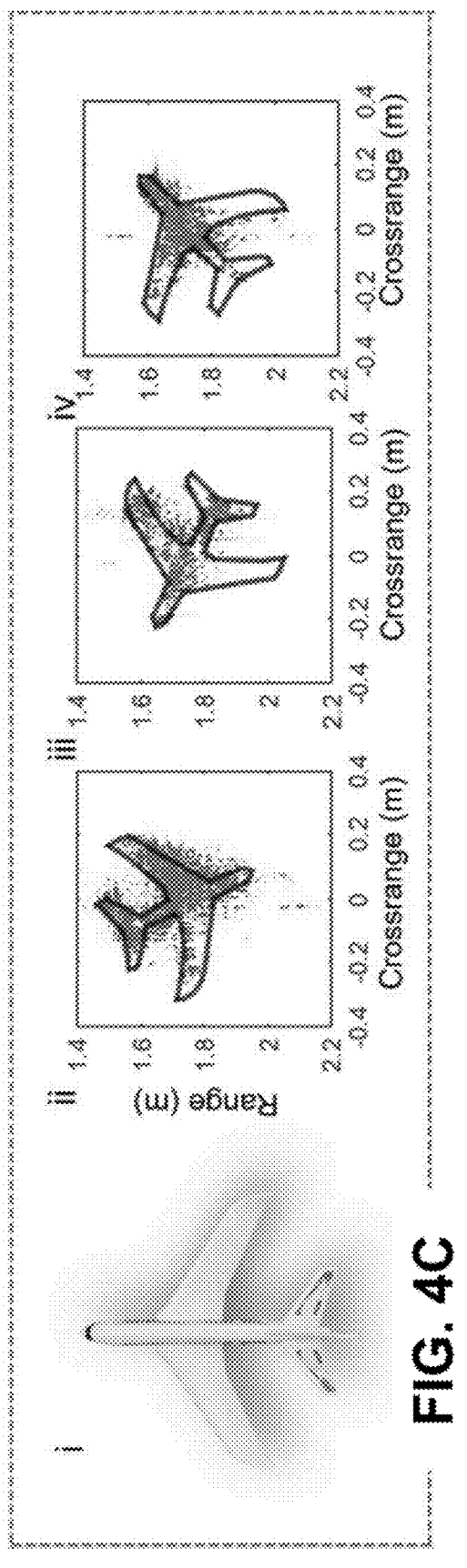
Figure 4D:
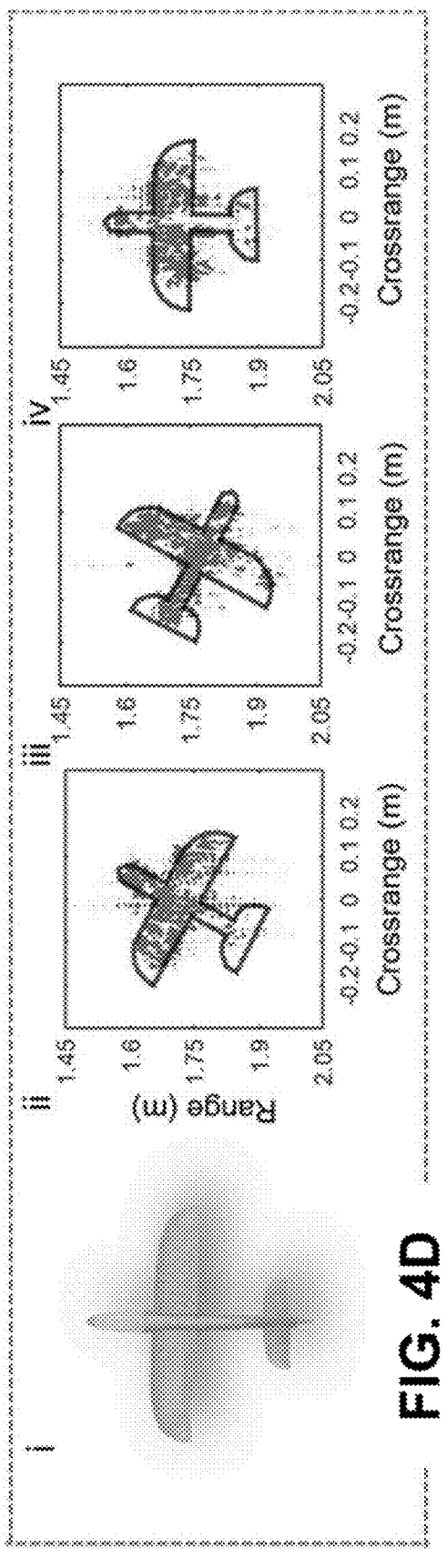
Figure 4E:
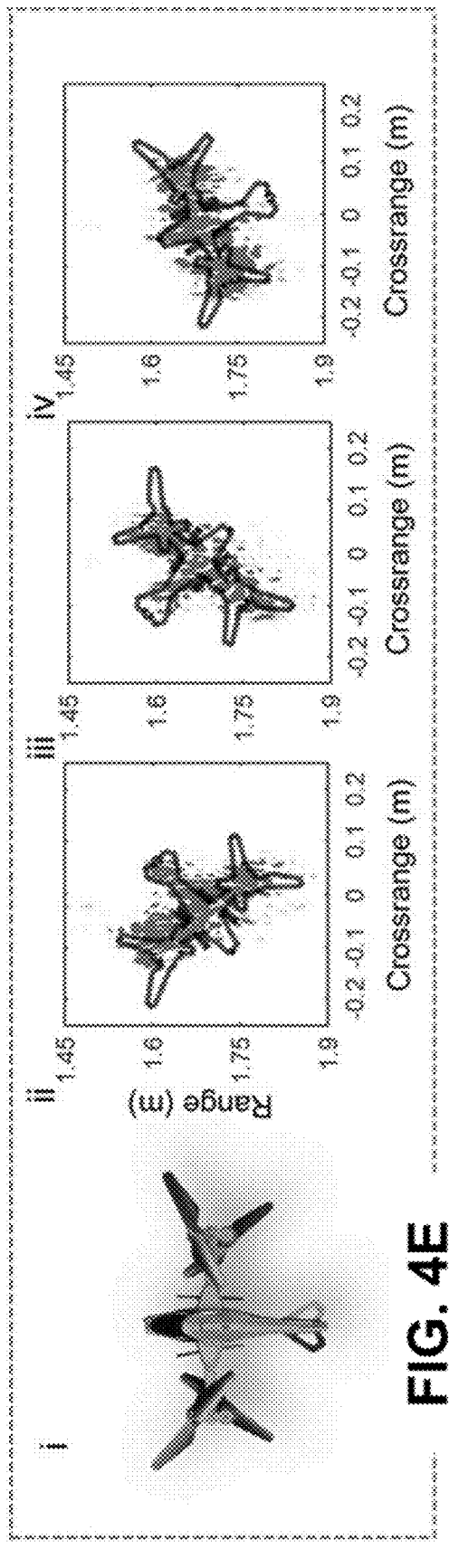
Figure 4F:
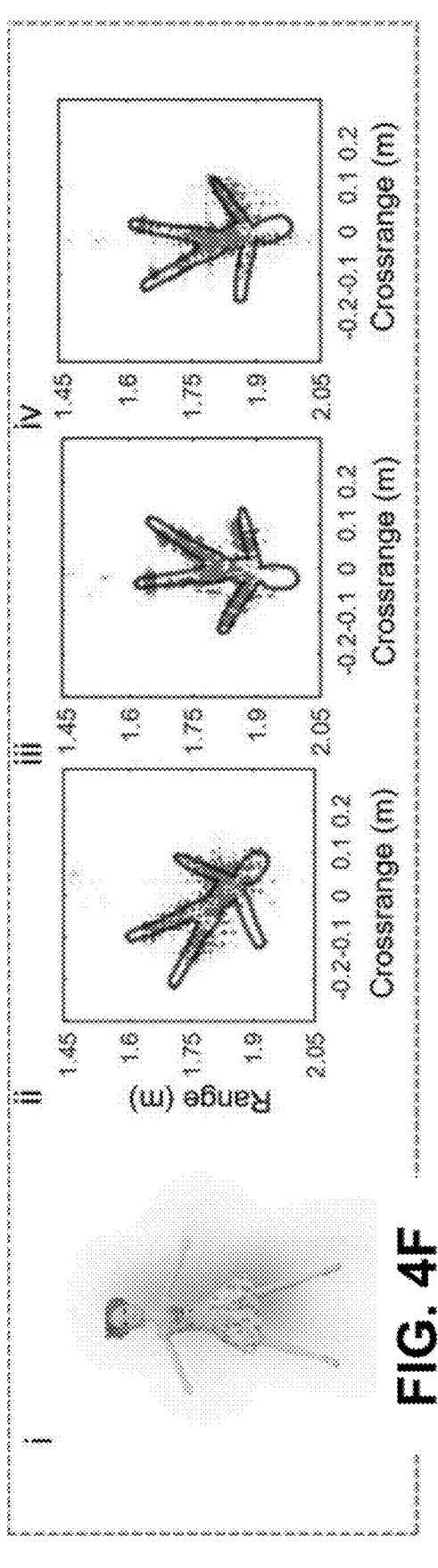

FIG. 4A depicts a construction of an ISAR as used in experiments, where the transceiver antennas are fixed while the target undergoes a rotation speed of 1 round per second during detection. To characterize the basic imaging ability of the photonic mmWave ISAR, we first place several small metal corner reflectors with a size of 3 cm×3 cm (inset i of FIG. 4B) in different arrangements (FIG. 4B) on a turntable. The resulting images (insets ii-iv of FIG. 4B) clearly reveal the numbers, sizes, and relative locations of the corresponding metal plates in good agreement with the actual settings as indicated in the upper left insets in each case. The radar images here and in subsequent panels of FIG. 4B represent top-down views of the targets under imaging, where the vertical axes represent the radial distances (ranges) from the radar antenna and the horizontal axes correspond to the azimuthal locations (cross ranges). The results show that our photonic mmWave ISAR is able to resolve and image multiple closely spaced targets (four in inset iv of FIG. 4B) simultaneously at a relatively longer range of ~1.7 m. To further demonstrate the capability of imaging real-world targets of different shapes, sizes, and poses, we replace the metal plates with a number of more complicated objects, including a large airplane (45 cm×49 cm, FIG. 4C), a medium airplane (33 cm×34 cm, FIG. 4D), a small airplane (21 cm×24 cm, FIG. 4E), and a doll (30 cm×20 cm, FIG. 4F). The processed images in FIGS. 4C-4F show that our system can successfully resolve the structural outlines of these targets at various rotation angles. It should be noted that the imaging signals are weaker and sometimes absent at the bottom sides of these images, since they correspond to features away from the radar antenna and the echo signals from these areas could be blocked by other thicker parts of the target. Nevertheless, our results show the clear distinction of tiny features like the 5 cm empennage of the small airplane (inset ii of FIG. 4E) and the 0.7 cm wide arms and legs of the doll (FIG. 4F), proving the successful achievement of a centimeter-resolution photonic mmWave ISAR using our integrated TFLN chip.

E. Experiments

E.1. Overview of Design and Fabrication of Devices Used for Testing

Devices are simulated using Ansys Lumerical Mode and High Frequency Simulation Software (Ansys HFSS). A 500 nm TFLN 4-inch from NANOLN is used to fabricate the designed devices. First, etching hard mask of $SiO_2$ is deposited on the LNOI surface through plasma-enhanced chemical vapor deposition. ASML UV Stepper lithography system (NFF, HKUST) with a resolution of 400 nm patterns waveguides, EOMs, and MMI on the 4-inch LNOI wafer die by die (1.5 cm×1.5 cm). Then, the exposed pattern is transferred to the $SiO_2$ hard mask using a standard fluorine-based dry etching process and to the TFLN layer with 250 nm waveguide height and 250 nm slab height using an optimized $Ar^+$ assistant ICP-RIE process. Afterwards, a second stepper lithography patterns the electrodes layer after removing the residual $SiO_2$ mask and redeposition $SiO_2$ cladding. After metal evaporation and lift-off process, ground-signal-ground electrodes with a gap of 5.5 μm are obtained which can ensure good electro-optic modulation efficiency and loss metal-induced optical losses. Finally, the chips are cleavage and end polishing carefully with a coupling loss of 4 dB/facet.

E.2. Characterization of the Devices on the TFLN Platform

To test the optical performance of the fabricated TFLN chips, optical input signal from a tunable telecom laser source (SANTEC TSL-510) is coupled to the chip using a lensed fiber. The output optical signal is collected by another lensed fiber and sent to a low-speed PD (125 MHz New Focus 1811). The optical loss of the TFLN waveguides is estimated by measuring the optical transmission spectrum of a racetrack resonator and fitting with a Lorentzian function. The measured loaded quality factors of the resonators are over one million, indicating a waveguide propagation loss of ~0.3 dB/cm.

To measure the half-wave voltage (Vz) of the fabricated EOMs, a kilohertz electrical triangular waveform generated from an arbitrary-waveform generator (AWG, RIGOL DG4102) is applied to the ground-signal-ground electrodes of the EOM through a probe (GGB industries, 50 GHz). The output optical signal of the EOM is detected using the same low-speed PD and monitored using a low-speed oscilloscope (RIGOL DS6104). For electro-optic $S_{21}$ response measurements, a frequency sweeping electrical signal generated from a 53 GHz VNA (Keysight E5080B) is sent to the EOM with a 500 load. A high-speed PD (XPDV2120R) is used to detect the modulated optical signal. The recovered electrical signal is sent back to the input port of the VNA. After calibrating the frequency responses of the probe, electrical cables, and PD, the $S_{21}$ frequency response of the EOM can be obtained, showing 3 dB bandwidths larger than 50 GHz in this case.

E.3. Ranging, Velocity and Imaging Measurement of the Photonic mmWave Radar

In our proof-of-concept radar detection experiments, a continuous wave optical carrier emitted from the tunable laser is first amplified by an erbium doped fiber amplifier (HaoMinOE EDFA-C-4) and coupled to TFLN radar chip through a lensed fiber. Benefiting from the high-power handling capability of TFLN, the high input optical power can improve the signal-to-noise ratio of the modulated output optical signal from the chip. A FPC is used to tune the input optical signal to TE mode for the largest EO modulation efficiency. The fundamental LFMW signal (with instantaneous frequency linearly increasing from 20 GHz to 25 GHz within 4 s) is generated from a high-speed AWG (Keysight M8196A, 33 GHz), amplified by an electrical power amplifier (Fairview microwave PE15A4021), combined with a DC voltage through a bias-tee (Marki microwave BT-0050), and used to drive EOM1 via the high-speed probe. The DC voltage is used to bias EOM1 at the null transmission point for the CS-DSB modulation scheme here. Optical spectrum of the CS-DSB modulated signal is monitored using an OSA (YOKOGAWA AQ6370D).

At the output side of the photonic mmWave radar chip, a lensed fiber array is used to collect the output optical signals from the first EOM 510 and the second EOM 140, respectively. The second optical signal 184 obtained at the MMI (as the splitting means 115) is amplified and detected by the first PD 120, which is a high-speed PD, to generate the radar signal 187, which can be monitored using an electrical spectrum analyzer (Agilent N9030A) and analyzed using a high-speed oscilloscope (Keysight UXR0404AP). In actual radar testing, the generated radar signal 187 is amplified by a two-stage electrical amplifier (Centellax OA4MVM3) before emitted to the free space through a horn antenna (SAGE Millimeter InC WR-22 SAZ-2410-22-S1), which is the transmitting antenna 127. The reflected echo signal 191 is collected by another horn antenna of the same type (which is the receiving antenna 131), amplified first by a LNA (SHF S807) and then a power amplifier (Centellax OA4MVM3), before used to drive the second EOM 140 through another high-speed probe. The optical output of the second EOM 140 is amplified and detected by the second PD 145, which is a low-speed PD. An oscilloscope (DSO-X 91604A) is used to capture the recovered electrical signal with a sampling rate of 1 GSa/s.

For ranging experiments, metallic plates with a size of 7 cm×10 cm are used as targets, which are placed at different positions with respect to the antenna. For velocity measurements, a toy balanced car with a size of 9 cm×6 cm is used as the target, whose velocity can be programmed by a FPGA. By sampling 50 ms of the recovered electrical signal using an oscilloscope, velocity information is obtained after Doppler-FFT, corresponding to a velocity resolution of 6.7 cm/s. For ISAR demonstration, the targets are placed on a home-made turntable with a set rotate speed of 1 round per second. The images of the detected targets are obtained with a two-dimensional resolution of 1.50 cm×1.06 cm after a two-dimensional FFT process to the collected 50 ms recovered electrical signal.

E.4. Performance Comparison with Previous Photonic Radar Demonstrations

TABLE 1

Performance comparison of photonic microwave and millimeter-wave radars.

| Ref. | Integration | Center frequency (GHz) | Bandwidth (GHz) | Distance resolution (cm) | Velocity resolution (m/s) | Imaging resolution (cm × cm) |
|---|---|---|---|---|---|---|
| [8] | No | 39.8 | 0.2 | 2300.00 | 0.556 | N/A |
| [9] | No | 22.0 | 8.0 | 2.00 | N/A | 2.00 × 2.00 |
| [10] | No | 15.0 | 4.0 | 1.88 | N/A | 1.88 × 2.00 |
| [11] | No | 14.6 | 0.6 | 25.00 | N/A | 25.00 × 25.00 |
| [12] | No | 5.0 | 10.0 | 1.37 | N/A | N/A |
| [13] | No | 94.5 | 5.0 | 3.00 | N/A | N/A |
| [14] | No | 96.5 | 9.6 | 1.53 | N/A | N/A |
| [15] | No | 57.5 | 7.0 | 2.14 | N/A | 2.14 × 2.14 |
| [23] | Yes | 14.1 | 0.1 | 150.00 | 0.500 | N/A |
| [24] | Yes | 9.9 | 0.04 | 375.00 | 5.000 | N/A |
| [25] | Yes | 15 | 6.00 | 2.70 | N/A | 2.70 × 2.70 |
| This work | Yes | 45.0 | 10.0 | 1.50 | 0.067 | 1.50 × 1.06 |

N/A = Information not available or not applicable.

REFERENCES

There follows a list of references that are occasionally cited in the specification. Each of the disclosures of these references is incorporated by reference herein in its entirety.

[1] Ravuri, S. et al. Skillful precipitation nowcasting using deep generative models of radar. *Nature* 597, 672-677 (2021).

[2] Li, C. et al. The Moon's farside shallow subsurface structure unveiled by Chang'E-4 Lunar Penetrating Radar. *Sci. Adv.* 6, eaay6898 (2020).

[3] Mercuri, M. et al. Vital-sign monitoring and spatial tracking of multiple people using a contactless radar-based sensor. *Nat. Electron.* 2, 252-262 (2019).

[4] Dang, S., Amin, O., Shihada, B. & Alouini, M.-S. What should 6G be? *Nat. Electron.* 3, 20-29 (2020).

[5] Matsumoto, H., Watanabe, I., Kasamatsu, A. & Monnai, Y. Integrated terahertz radar based on leaky-wave coherence tomography. *Nat. Electron.* 3, 122-129 (2020).

[6] Capmany, J. & Novak, D. Microwave photonics combines two worlds. *Nat. Photon.* 1, 319-330 (2007).

[7] McKinney, J. D. Photonics illuminates the future of radar. *Nature* 507, 310-312 (2014).

[8] Ghelfi, P. et al. A fully photonics-based coherent radar system. *Nature* 507, 341-345 (2014).

[9] Zhang, F. et al. Photonics-based broadband radar for high-resolution and real-time inverse synthetic aperture imaging. *Opt. Express* 25, 16274-16281 (2017).

[10] Zhou, P., Zhang, R., Li, N., Jiang, Z. & Pan, S. An RF-Source-Free Reconfigurable Microwave Photonic Radar With High-Resolution and Fast Detection Capability. *J. Light. Technol.* 40, 2862-2869 (2022).

[11] Li, R. et al. Demonstration of a microwave photonic synthetic aperture radar based on photonic-assisted signal generation and stretch processing. *Opt. Express* 25, 14334-14340 (2017).

[12] Zhang, Z., Liu, Y., Stephens, T. & Eggleton, B. J. Photonic radar for contactless vital sign detection. *Nat. Photon.* 17, 791-797 (2023).

[13] Wang, Y. et al. Joint communication and radar sensing functions system based on photonics at the W-band. *Opt. Express* 30, 13404-13415 (2022).

[14] Dong, B. et al. Demonstration of photonics-based flexible integration of sensing and communication with adaptive waveforms for a W-band fiber-wireless integrated network. *Opt. Express* 30, 40936-40950 (2022).

[15] Zhong, N. et al. Spectral-Efficient Frequency-Division Photonic Millimeter-Wave Integrated Sensing and Communication System Using Improved Sparse LFM Sub-bands Fusion. *J. Light. Technol.* 1-10 (2023).

[16] Marpaung, D. et al. Integrated microwave photonics. *Laser Photonics Rev.* 7, 506-538 (2013).

[17] Marpaung, D., Yao, J. & Capmany, J. Integrated microwave photonics. *Nat. Photon.* 13, 80-90 (2019).

[18] Daulay, O. et al. Ultrahigh dynamic range and low noise figure programmable integrated microwave photonic filter. *Nat. Commun.* 13, 7798 (2022).

[19] Shu, H. et al. Microcomb-driven silicon photonic systems. *Nature* 605, 457-463 (2022).

[20] Xu, X. et al. Self-calibrating programmable photonic integrated circuits. *Nat. Photon.* 16, 595-602 (2022).

[21] Bai, B. et al. Microcomb-based integrated photonic processing unit. *Nat. Commun.* 14, 66 (2023).

[22] Chen, R. et al. Breaking the temporal and frequency congestion of LiDAR by parallel chaos. *Nat. Photon.* 17, 306-314 (2023).

[23] Falconi, F. et al. A Combined Radar & Lidar System Based on Integrated Photonics in Silicon-on-Insulator. *J. Light. Technol.* 39, 17-23 (2021).

[24] Scotti, F. et al. Indoor field-trial in X band of a photonics-based multiband radar on a packaged silicon chip. 2021 *International Topical Meeting on Microwave Photonics (MWP)*, 1-4 (2021).

[25] Li, S. et al. Chip-based microwave-photonic radar for high-resolution imaging. *Laser Photonics Rev.* 14, 1900239 (2020).

[26] Manolatou, C. & Lipson, M. All-Optical Silicon Modulators Based on Carrier Injection by Two-Photon Absorption. *J. Light. Technol.* 24, 1433 (2006).

[27] Wang, C. et al. Integrated lithium niobate electro-optic modulators operating at CMOS-compatible voltages. *Nature* 562, 101-104 (2018).

[28] He, M. et al. High-performance hybrid silicon and lithium niobate Mach-Zehnder modulators for 100 Gbit s-1 and beyond. *Nat. Photon.* 13, 359-364 (2019).

[29] Zhang, M. et al. Broadband electro-optic frequency comb generation in a lithium niobate microring resonator. *Nature* 568, 373-377 (2019).

[30] Li, M. et al. Lithium niobate photonic-crystal electro-optic modulator. *Nat. Commun.* 11, 4123 (2020).

[31] Yu, M. et al. Integrated femtosecond pulse generator on thin-film lithium niobate. *Nature* 612, 252-258 (2022).

[32] Guo, Q. et al. Femtojoule femtosecond all-optical switching in lithium niobate nanophotonics. *Nat. Photon.* 16, 625-631 (2022).

[33] Boes, A. et al. Lithium niobate photonics: Unlocking the electromagnetic spectrum. *Science* 379, eabj4396 (2023).

[34] Snigirev, V. et al. Ultrafast tunable lasers using lithium niobate integrated photonics. *Nature* 615, 411-417 (2023).

[35] Stokowski, H. S. et al. Integrated quantum optical phase sensor in thin film lithium niobate. *Nat. Commun.* 14, 3355 (2023).

[36] Kharel, P., Reimer, C., Luke, K., He, L. & Zhang, M. Breaking voltage-bandwidth limits in integrated lithium niobate modulators using micro-structured electrodes. *Optica* 8, 357-363 (2021).

[37] Zhang, Y. et al. Systematic investigation of millimeter-wave optic modulation performance in thin-film lithium niobate. *Photonics Res.* 10, 2380-2387 (2022).

[38] Arab Juneghani, F. et al. Thin-Film Lithium Niobate Optical Modulators with an Extrapolated Bandwidth of 170 GHz. *Adv. Photon. Res.* 4, 2200216 (2023).

[39] Xu, M. et al. Dual-polarization thin-film lithium niobate in-phase quadrature modulators for terabit-per-second transmission. *Optica* 9, 61-62 (2022).

[40] Liu, X. et al. Broadband Meandered Thin-Film Lithium Niobate Modulator With Ultra-Low Half-Wave Voltage. *IEEE Photon. Technol. Lett.* 34, 424-427 (2022).

[41] Li, M. et al. Lithium niobate photonic-crystal electro-optic modulator. *Nat. Commun.* 11, 4123 (2020).

[42] Feng, H. et al. Ultra-high-linearity integrated lithium niobate electro-optic modulators. *Photonics Res.* 10, 2366-2373 (2022).

[43] Luke, K. et al. Wafer-scale low-loss lithium niobate photonic integrated circuits. *Opt. Express* 28, 24452-24458 (2020).

[44] Sun, W., Zhang, K., Feng, H. & Wang, C. Wafer-scale thin-film lithium niobate device fabrication and characterization. *TENCON 2022-2022 IEEE Region 10 Conference (TENCON)*, 1-2 (2022).

[45] Zhang, M., Wang, C., Cheng, R., Shams-Ansari, A. & Loncar, M. Monolithic ultra-high-Q lithium niobate microring resonator. *Optica* 4, 1536-1537 (2017).

[46] Chen, Y. K., Zhang, K., Feng, H. K., Sun, W. Z. & Wang, C. Design and resonator-assisted characterization of high-performance lithium niobate waveguide crossings. *Opt. Lett.* 48, 2218-2221 (2023).

[47] Zhou, J. X. et al. Electro-Optically Switchable Optical True Delay Lines of Meter-Scale Lengths Fabricated on Lithium Niobate on Insulator Using Photolithography Assisted Chemo-Mechanical Etching. *Chin. Phys. Lett.* 37 (2020).

[48] Feng, H. et al. Integrated lithium niobate microwave photonic processing engine. *arXiv preprint arXiv: 2306.14415* (2023).

[49] Kharel, P., Reimer, C., Luke, K., He, L. Y. & Zhang, M. Breaking voltage-bandwidth limits in integrated lithium niobate modulators using micro-structured electrodes. *Optica* 8, 1218-1218 (2021).

[50] Shankarananda, S. H. K., "External Modulators and Mathematical Modeling of Mach-Zehnder Modulator" *IJISET—International Journal of Innovative Science, Engineering & Technology*, Vol. 3 Issue 12, December 2016.

What is claimed is:

1. A photonic millimeter-wave (mmWave) radar system comprising:

a light source for generating an optical carrier;

a signal generator for generating a first electrical signal having a linear frequency modulated waveform (LFMW);

a frequency multiplying module for frequency-multiplying the first electrical signal, wherein the frequency multiplying module comprises:

a means for amplitude-modulating the optical carrier with the first electrical signal to yield a first optical signal; and a first photodetector (PD) for converting a first attenuated copy of the first optical signal into a second electrical signal such that the second electrical signal is generated according to a square of an envelope of the first attenuated copy to thereby cause an instantaneous frequency of the second electrical signal to be doubled of an instantaneous frequency of the first electrical signal;

a means for splitting the first optical signal into a second optical signal and a third optical signal, wherein the second optical signal is the first attenuated copy of the first optical signal as forwarded to the first PD;

a transimpedance amplifier (TIA) for amplifying the second electrical signal to generate a radar signal, the radar signal being a chirp signal used for remote sensing;

a low-noise amplifier (LNA) for amplifying a reflected echo signal to yield a third electrical signal, the reflected echo signal being a signal formed with one or more echoes respectively reflected from one or more objects irradiated by the radar signal in the remote sensing; and a frequency de-chirp module for de-chirping the reflected echo signal and resolving the one or more echoes, wherein the frequency de-chirp module comprises:

a second electro-optic modulator (EOM) for amplitude-modulating the third optical signal with the third electrical signal to yield a fourth optical signal, wherein the second EOM is configured to be biased at a quadrature transmission point; and a second PD for converting the fourth optical signal to a fourth electrical signal such that the fourth electrical signal is generated according to a square of an envelope of the fourth optical signal, whereby both biasing the second EOM at the quadrature transmission point and generating the fourth electrical signal according to the square of the envelope of the fourth optical signal de-chirps the reflected echo signal and enables a delay of an individual echo in the reflected echo signal to be determinable from a peak in a frequency spectrum of the fourth electrical signal;

wherein the amplitude-modulating means, second EOM and splitting means are thin-film lithium niobate (TFLN) photonic circuits integrated on a lithium niobate photonic integrated circuit (LNPIC).

2. The photonic mmWave radar system of claim 1, wherein the radar signal is in a frequency range from 1 to 300 GHz.

3. The photonic mmWave radar system of claim 1, wherein the signal generator is a digital-to-analog converter (DAC) arranged to be inputted with a digital signal of the LFMW.

4. The photonic mmWave radar system of claim 1 further comprising:

an analog-to-digital converter (ADC) for digitizing the fourth electrical signal received from the second PD.

5. The photonic mmWave radar system of claim 4 further comprising:

a digital signal processor (DSP) configured to receive the digitized fourth electrical signal and determine the delay of the individual echo from the received digitized fourth electrical signal.

6. The photonic mmWave radar system of claim 5 further comprising:

a transmitting antenna for emitting the radar signal to outside the system for remotely sensing the one or more objects; and a receiving antenna for receiving the reflected echo signal.

7. The photonic mmWave radar system of claim 6, wherein each of the transmitting and receiving antennas is a horn antenna.

8. The photonic mmWave radar system of claim 6, wherein each of the transmitting and receiving antennas is a microstrip antenna, a patch antenna, a slot antenna or a Goubau-line antenna.

9. The photonic mmWave radar system of claim 4, wherein at least the light source, the signal generator, the LNPIC, the TIA, the LNA, the first PD, the second PD and the ADC are integrated on an integrated photonic mmWave radar chip.

10. The photonic mmWave radar system of claim 5, wherein at least the light source, the signal generator, the LNPIC, the TIA, the LNA, the first PD, the second PD, the ADC and the DSP are integrated on an integrated photonic mmWave radar chip.

11. The photonic mmWave radar system of claim 10, wherein the first and second PDs are integrated on the LNPIC.

12. The photonic mmWave radar system of claim 6, wherein at least the light source, the DAC, the LNPIC, the TIA, the LNA, the first PD, the second PD, the ADC, the DSP, the transmitting antenna and the receiving antenna are integrated on an integrated photonic mmWave radar chip.

13. The photonic mmWave radar system of claim 12, wherein the transmitting and receiving antennas are integrated on the LNPIC.

14. The photonic mmWave radar system of claim 1, wherein the amplitude-modulating means is selected from:

a first EOM configured to be biased at a null transmission point of the first EOM;

a cascade of a third EOM and a first micro ring filter, an output of the third EOM being connected to an input of the first micro ring filter, wherein the third EOM is configured to be biased at a full transmission point of the third EOM; and a cascade of a dual-parallel Mach-Zehnder modulator (DPMZM) and a second micro ring filter, an output of the DPMZM being connected to an input of the second micro ring filter, wherein the DPMZM comprises a first MZM and a second MZM, the first and second MZMs being connected in parallel, the first MZM being arranged to receive the first electrical signal, the second MZM being arranged to receive a 90°-phase-shifted version of the first electrical signal, and wherein the first MZM, the second MZM and a main-DC bias of the DPMZM are biased at respective maximum transmission points.

15. The photonic mmWave radar system of claim 14, wherein each of the first and third EOMs is a capacitively loaded traveling-wave electrode EOM.

16. The photonic mmWave radar system of claim 1, wherein the splitting means is selected from a multimode interferometer (MMI), a directional coupler and an adiabatic coupler.

17. The photonic mmWave radar system of claim 16, wherein the MMI is a 50:50 MMI.

18. A photonic mmWave radar system for generating a radar signal and analyzing a reflected echo signal, the reflected echo signal being a signal formed with one or more echoes respectively reflected from one or more objects irradiated by the radar signal, the system comprising:

a light source for generating an optical carrier;

a signal generator for generating a first electrical signal having a linear frequency modulated waveform (LFMW);

a frequency multiplying module for frequency-multiplying the first electrical signal, wherein the frequency multiplying module comprises:

a means for amplitude-modulating the optical carrier with the first electrical signal to yield a first optical signal; and a first photodetector (PD) for converting a first attenuated copy of the first optical signal into a second electrical signal such that the second electrical signal is generated according to a square of an envelope of the first attenuated copy to thereby cause an instantaneous frequency of the second electrical signal to be doubled of an instantaneous frequency of the first electrical signal, whereby the radar signal is formed by amplifying the second electrical signal such that the frequency multiplying module reduces a bandwidth requirement of the signal generator in generating the radar signal; and a transimpedance amplifier (TIA) for amplifying the second electrical signal to generate the radar signal, the radar signal being a chirp signal used for remote sensing.

19. The photonic mmWave radar system of claim 18 further comprising:

a means for splitting the first optical signal into a second optical signal and a third optical signal, wherein the second optical signal is the first attenuated copy of the first optical signal as forwarded to the first PD;

a low-noise amplifier (LNA) for amplifying the reflected echo signal to yield a third electrical signal; and a frequency de-chirp module for de-chirping the reflected echo signal and resolving the one or more echoes, wherein the frequency de-chirp module comprises:

a second EOM for amplitude-modulating the third optical signal with the third electrical signal to yield a fourth optical signal, wherein the second EOM is configured to be biased at a quadrature transmission point; and a second PD for converting the fourth optical signal to a fourth electrical signal such that the fourth electrical signal is generated according to a square of an envelope of the fourth optical signal, whereby both biasing the second EOM at the quadrature transmission point and generating the fourth electrical signal according to the square of the envelope of the fourth optical signal de-chirps the reflected echo signal and enables a delay of an individual echo in the reflected echo signal to be determinable from a peak in a frequency spectrum of the fourth electrical signal;

wherein the amplitude-modulating means, second EOM and splitting means are thin-film lithium niobate (TFLN) photonic circuits integrated on a lithium niobate photonic integrated circuit (LNPIC).

20. The photonic mmWave radar system of claim 18, wherein the signal generator is a digital-to-analog converter (DAC) arranged to be inputted with a digital signal of the LFMW.

* * * * *